(12) United States Patent
Parthasarathi et al.

(10) Patent No.: US 10,373,612 B2
(45) Date of Patent: Aug. 6, 2019

(54) ANCHORED SPEECH DETECTION AND SPEECH RECOGNITION

(71) Applicant: Amazon Technologies, Inc., Seattle, WA (US)

(72) Inventors: Sree Hari Krishnan Parthasarathi, Seattle, WA (US); Bjorn Hoffmeister, Seattle, WA (US); Brian King, Seattle, WA (US); Roland Maas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/196,228

(22) Filed: Jun. 29, 2016

(65) Prior Publication Data

US 2017/0270919 A1  Sep. 21, 2017

Related U.S. Application Data

(60) Provisional application No. 62/311,082, filed on Mar. 21, 2016.

(51) Int. Cl.
*G10L 15/02* (2006.01)
*G10L 15/08* (2006.01)
(Continued)

(52) U.S. Cl.
CPC .............. *G10L 15/20* (2013.01); *G10L 15/02* (2013.01); *G10L 15/08* (2013.01); *G10L 15/16* (2013.01);
(Continued)

(58) Field of Classification Search
CPC .... G10L 2015/088; G10L 15/02; G10L 15/16
See application file for complete search history.

(56) References Cited

U.S. PATENT DOCUMENTS 9,558,749 B1 * 1/2017 Secker-Walker ....... G10L 17/02
2010/0223056 A1 * 9/2010 Kadirkamanathan ... G10L 15/02
704/235
(Continued)

OTHER PUBLICATIONS

Variani, Ehsan, et al. "Deep neural networks for small footprint text-dependent speaker verification." Acoustics, Speech and Signal Processing (ICASSP), 2014 IEEE International Conference on. IEEE, 2014.*
(Continued)

*Primary Examiner* — Matthew H Baker
(74) *Attorney, Agent, or Firm* — Pierce Atwood LLP

(57) ABSTRACT

A system configured to process speech commands may classify incoming audio as desired speech, undesired speech, or non-speech. Desired speech is speech that is from a same speaker as reference speech. The reference speech may be obtained from a configuration session or from a first portion of input speech that includes a wakeword. The reference speech may be encoded using a recurrent neural network (RNN) encoder to create a reference feature vector. The reference feature vector and incoming audio data may be processed by a trained neural network classifier to label the incoming audio data (for example, frame-by-frame) as to whether each frame is spoken by the same speaker as the reference speech. The labels may be passed to an automatic speech recognition (ASR) component which may allow the ASR component to focus its processing on the desired speech.

17 Claims, 22 Drawing Sheets

(51) Int. Cl.
| | |
|---|---|
| *G10L 15/16* | (2006.01) |
| *G10L 15/20* | (2006.01) |
| *G10L 17/02* | (2013.01) |
| *G10L 17/06* | (2013.01) |
| *G10L 17/18* | (2013.01) |
| *G10L 25/78* | (2013.01) |
| *G10L 25/87* | (2013.01) |

(52) U.S. Cl.
CPC .............. *G10L 17/06* (2013.01); *G10L 17/18* (2013.01); *G10L 25/87* (2013.01); *G10L 17/02* (2013.01); *G10L 2015/088* (2013.01); *G10L 2025/783* (2013.01)

(56) References Cited

U.S. PATENT DOCUMENTS

| | | | |
|---|---|---|---|
| 2013/0166296 A1 | 7/2013 | Scheffer | |
| 2014/0274203 A1* | 9/2014 | Ganong, III | H04W 52/0251 455/556.1 |
| 2015/0127336 A1* | 5/2015 | Lei | G10L 17/18 704/232 |
| 2015/0294670 A1* | 10/2015 | Roblek | G10L 17/005 704/232 |
| 2016/0019889 A1* | 1/2016 | Alvarez Guevara | G10L 15/08 704/254 |
| 2016/0180838 A1 | 6/2016 | Parada San Martin et al. | |
| 2016/0293167 A1* | 10/2016 | Chen | G10L 17/18 |
| 2017/0069327 A1* | 3/2017 | Heigold | G10L 17/18 |
| 2017/0140761 A1* | 5/2017 | Secker-Walker | G10L 17/06 |

OTHER PUBLICATIONS

Heigold, Georg, et al. "End-to-end text-dependent speaker verification." Acoustics, Speech and Signal Processing (ICASSP), 2016 IEEE International Conference on. IEEE, 2016.*

Parveen, Shahla, Abdul Qadeer, and Phil Green. "Speaker recognition with recurrent neural networks." Sixth International Conference on Spoken Language Processing. 2000.*

Hossain, Md Murad, Boshir Ahmed, and Mahmuda Asrafi. "A real time speaker identification using artificial neural network." Computer and information technology, 2007. iccit 2007. 10th international conference on. IEEE, 2007.*

Yu-An Chung, et al.; "Audio Word2Vec: Unsupervised Learning of Audio Segment Representations using Sequence-to-sequence Autoencoder"; ARXIV. ORG; Cornell University Library, 201 Olin Library Cornell University Ithaca, NY; Mar. 3, 2016; XP080686952, the whole document.

International Search Report; dated Jul. 3, 2017; International Application No. PCT/US2017/018647.

International Preliminary Report on Patentability from the International Bureau for PCT/US2017/018647, dated Oct. 4, 2018.

* cited by examiner

For Input Audio Frame n

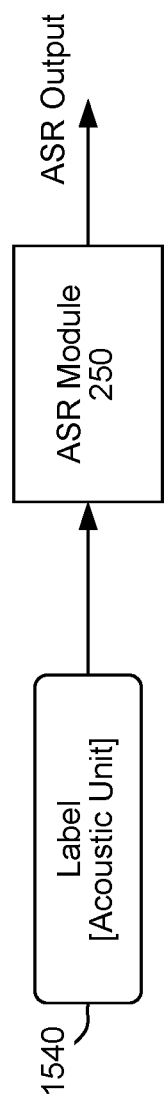

ANCHORED SPEECH DETECTION AND SPEECH RECOGNITION

CROSS-REFERENCE TO RELATED APPLICATION DATA

This application claims priority to U.S. Provisional Patent Application Ser. No. 62/311,082, entitled "ANCHORED SPEECH DETECTION AND SPEECH RECOGNITION," filed on Mar. 21, 2016, in the names of Brian King, et al. The above provisional application is herein incorporated by reference in its entirety.

BACKGROUND

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 16B illustrates performing ASR using input audio data and a label corresponding to the input audio data according to embodiments of the present disclosure.

DETAILED DESCRIPTION

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU within a reasonable time. Because of this, a distributed computing environment may be used when performing speech processing. A typical distributed environment may involve a local device having one or more microphones configured to capture sounds from a user speaking and convert those sounds into an audio signal. Thus, the mechanical sound wave comprising the audio may be converted to an audio signal/data which is data representing the audio, for example pulse-code modulation (PCM) audio data. The audio signal/data may then be sent to a downstream remote device for further processing, such as converting the audio signal into an ultimate command. The command may then be executed by a combination of remote and local devices depending on the command itself.

In certain situations, an environment in which a speech command is spoken may be crowded, loud, or otherwise noisy in a manner that may interfere with speech processing. For example, a user may speak an utterance including a command for a system to execute, but the device capturing the user's utterance may be in an environment with other individuals who are also talking. A system may have difficulty in such situations identifying audio corresponding to the user who spoke the command (i.e., the desired speaker) so that speech recognition may be performed on that desired audio rather than on speech from other persons who are not speaking commands to the system.

Offered is a system and method that improves the ability of the system to identify speech from a desired user during a command interaction with a user in a manner that does not significantly impact latency yet still allows the system to distinguish desired speech from undesired speech.

Figure 1:
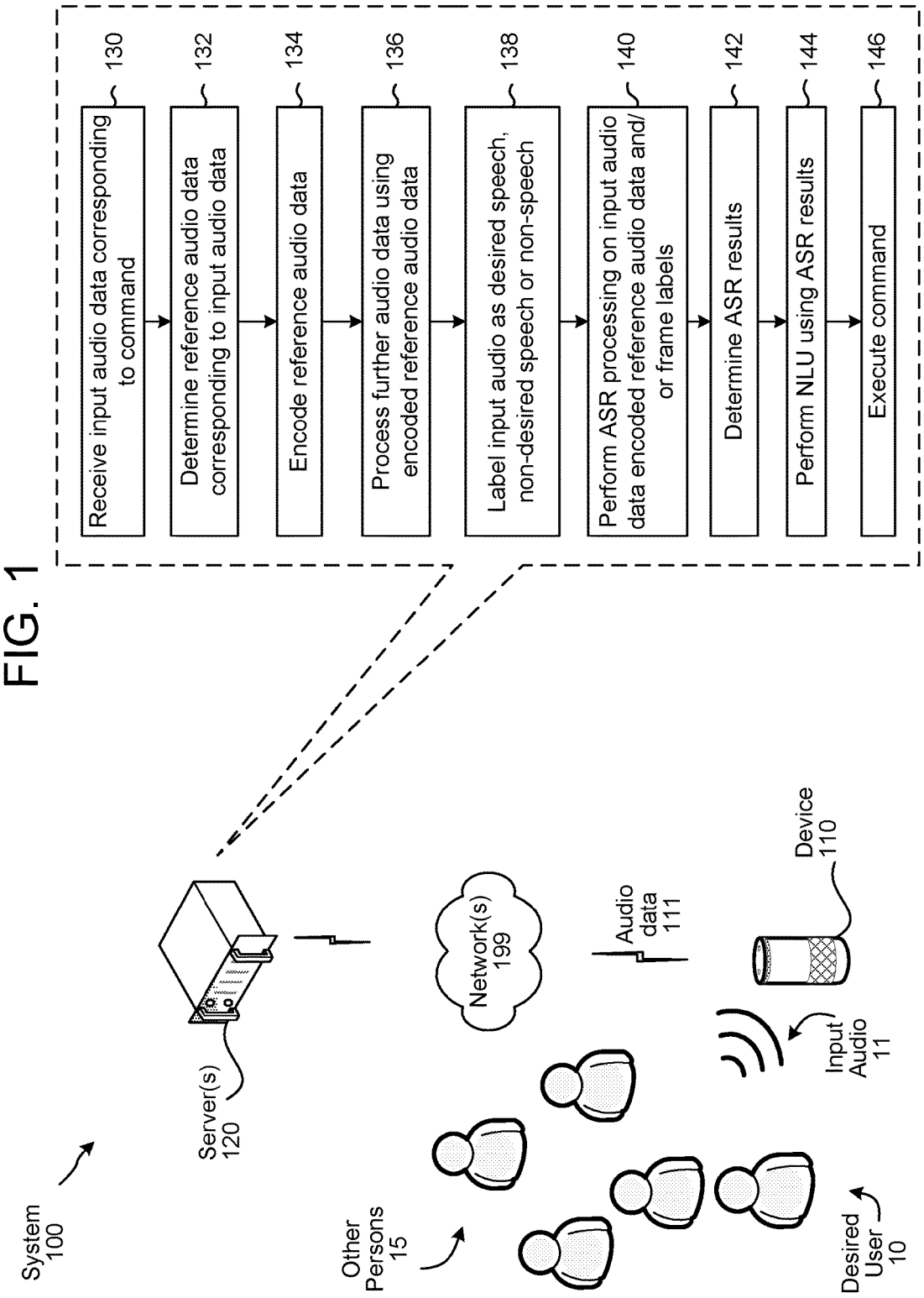
FIG. 1 shows a system configured to perform speech recognition using a recurrent neural network representation of a lattice according to embodiments of the present disclosure.

FIG. 1 shows a system 100 configured to perform speech recognition using improved desired speaker detection according to embodiments of the disclosure. Although FIG. 1, and lower figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to a desired user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, a device 110 receives an audio input 11 corresponding to a spoken utterance from a desired user 10. The input audio 11 may also include speech or other noise from other persons 15 who are also local to device 110. The device 110 may convert the audio 11 into audio data 111 and send the audio data to the server(s) 120. A server(s) 120 may then receive (130) the audio data 111 corresponding to the spoken command via the network 199. The server 120 determines (132) reference audio data corresponding to the desired speaker of the input audio data 111. The reference audio data may be a first portion of the input audio data 111 or may be other reference audio data as discussed below. The server 120 encodes (134) the reference audio data to obtain encoded reference audio data. If the reference audio data was available ahead of time, this may occur in advance of receiving the audio data 111. If the reference audio data is taken from the audio data 111 the encoding may occur after receipt of the audio data 111. Various encoding techniques, including those discussed below in reference to FIG. 9, may be used. The server 120 then processes (136) further input audio data (such as audio feature vectors corresponding to further audio frames) using the encoded reference audio data. An audio frame corresponds to a particular set of audio data, for example 25 ms worth of PCM or similar audio data. For example, the server 120 may use a classifier or other trained machine learning model to determine if the incoming audio feature vectors represent speech from the same speaker as the speech in the reference audio data by using the encoded reference audio data. The server then labels (138) each audio feature vector (and/or the corresponding audio frame) as including desired speech, non-desired speech or non-speech. This labeling may include assigning, for each audio feature vector/input audio frame, a first probability that the particular audio frame corresponds to desired speech, a second probability that the particular audio frame corresponds to non-desired speech, and a third probability that the particular audio frame corresponds to non-speech. The process may be repeated for each audio feature vector. The system then performs (140) ASR processing on the input audio frames (or corresponding audio feature vectors) using the encoded reference audio data and/or the individual frame labels/probabilities. This may enable the system to focus its ASR processing on the portions of the input audio corresponding to the desired speaker 10. The system may then determine (142) ASR results, perform NLU (144) on the ASR results and execute (146) a command, which should correspond to the spoken utterance of the desired user 10.

Figure 2:
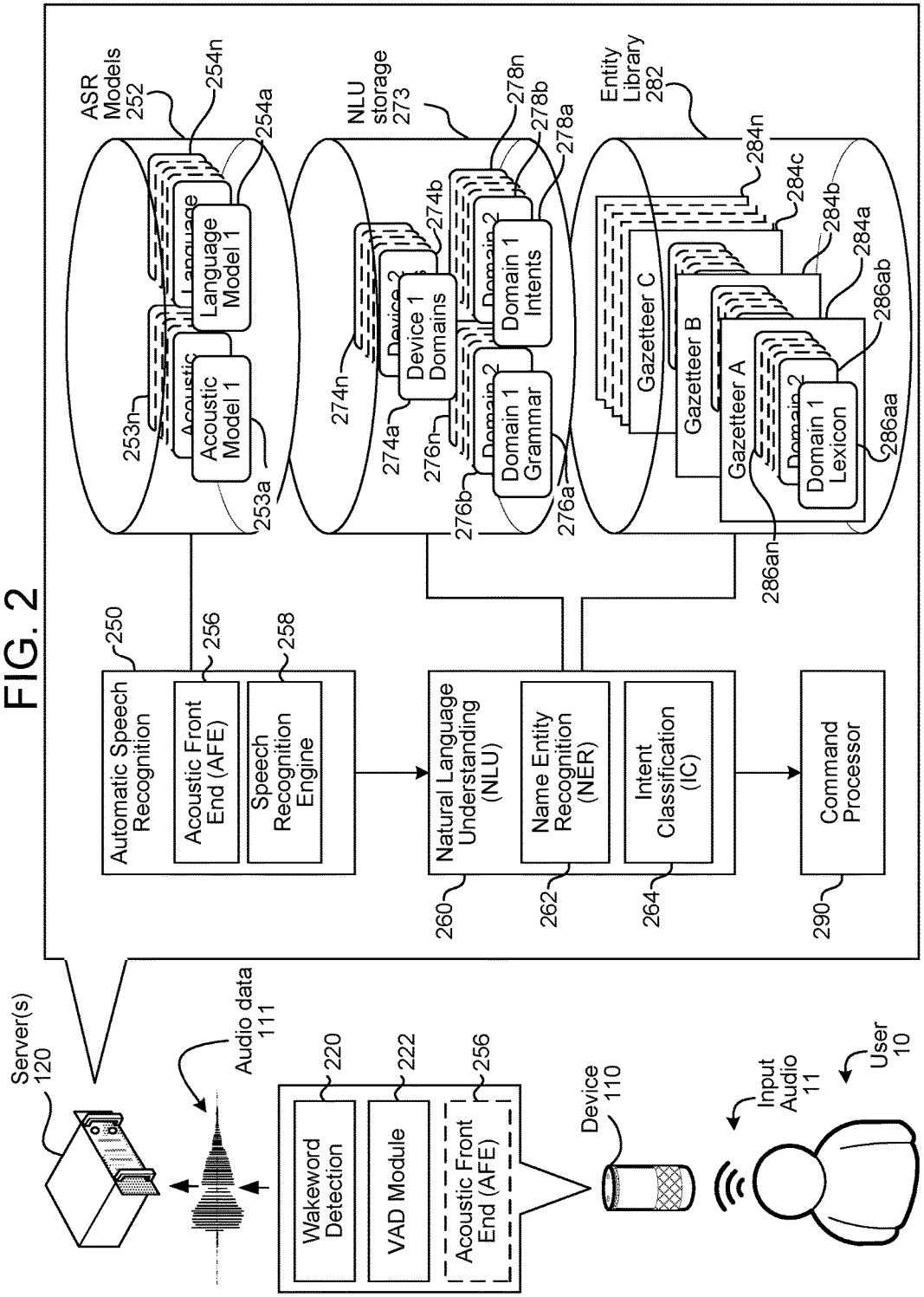
FIG. 2 is a conceptual diagram of a speech processing system according to embodiments of the present disclosure.

Further details of performing speech recognition using the present improvements are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques implemented by a voice activity detector 222. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once voice activity is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recurrent neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending.

Upon receipt by the server(s) 120, the system 100 may use various techniques for determining the beginning and end of speech to be processed. For purposes of illustration, in system 100 the beginpoint of speech is described as determined by the device 110 and the endpoint of the speech is described as determined by the server 120 (after receipt of corresponding audio data from the device 110), but different components may perform the beginpointing/endpointing without diverging from the present disclosure.

To determine the beginning or end of an audio command, a number of techniques may be used. In one embodiment the system may determine pauses in spoken words and may interpret those pauses as potential breaks in a conversation. Thus, while the discussion herein may refer to determining or declaring an endpoint, what the system does is estimate that a spoken command has ended (i.e., reached an endpoint) based on the various considerations described herein. Breaks in a conversation may be considered as breaks between utterances and thus considered the beginning (beginpoint) or end (endpoint) of an utterance. The beginning/end of an utterance may also be detected using speech/voice characteristics. Other techniques may also be used to determine the beginning of an utterance (also called beginpointing) or end of an utterance (endpointing). Beginpointing/endpointing may be based, for example, on the number of silence/non-speech audio frames, for instance the number of consecutive silence/non-speech frames. For example, some systems may employ energy based or acoustic model based VAD techniques. Such techniques may determine whether speech is present in an audio input based on various quantitative aspects of the audio input, such as the spectral slope between one or more frames of the audio input; the energy levels (such as a volume, intensity, amplitude, etc.) of the audio input in one or more spectral bands; zero-crossing rate; the signal-to-noise ratios of the audio input in one or more spectral bands; or other quantitative aspects. These factors may be compared to one or more thresholds to determine if a break in speech has occurred that qualifies as a beginpoint/endpoint. Such thresholds may be set according to user input, or may be set by a device. In some embodiments, the beginpointing/endpointing may be further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored. The beginpointing/endpointing may compare the energy level to the energy level threshold (and optionally to the threshold duration) to determine whether the energy level threshold is met.

In certain embodiments, HMM or GMM techniques may be applied to compare the audio input to one or more acoustic models in speech storage, which acoustic models may include models corresponding to speech, noise (such as environmental noise or background noise), or silence/non-speech. Non-speech frames may not necessarily represent complete silence (for example, certain noise may still be present in the audio), but the frames may lack acoustic characteristics typical of speech and thus may be deemed to be non-speech frames. Still other techniques may be used to determine whether speech begins/ends in the input audio data.

The length of a pause sufficient to qualify the pause as a beginpoint/endpoint may depend on the identity of the speaker. If the system is configured to perform speaker identification (techniques for which are known in the art), the system may identify the speaker and adjust the pause length sufficient to determine an endpoint accordingly. The system may also be configured to learn pause tendencies of different speakers and to adjust its endpointing processing accordingly. For example, during system training/enrollment, a speaker's pause tendencies between utterances or between topics may be recorded and used to train the endpointing processing of the system. Such tendencies may also be recorded at runtime and used to further adjust the system. Different pause lengths may also be configured for different spoken languages as the pause length may vary depending on the language spoken (for example pauses in conversational English may be different from pauses in conversational Spanish). The begin/end of an utterance may also be determined by various characteristics of the speech including pitch, prosody, volume, rhythm, stress, intonation, cepstrum, etc. of the speech which may be determined by audio and/or speech processing components of the device. For example, a rising or falling tone of a voice may indicate a new utterance, the end of a command, etc. The system may train on voice characteristics (which may or may not be also tied to speaker identity) that indicate when an utterance ends, and thus when an end of the speech should be marked by the system. These techniques may be used to modify/customize the language models discussed above, such that expected pauses in the language model(s) may be based on an identity of a speaker.

Using variations of the techniques described above, the beginpointing/endpointing may determine a confidence level whose value corresponds to a likelihood that the location of the point in question (i.e., the point in the audio data at which the beginpointing/endpointing occurs) represents the start/end of an utterance/command. The confidence score may depend on factors such as the technique used to determine the marker, the length of the pause, the speaker identity, etc. For example, if the confidence level satisfies a confidence level threshold, it may be determined that a detected silence is sufficient (e.g., the length of a pause in the speech exceeds a threshold), that speech is present in the audio input, and that an utterance begin/end may be marked. However, if the confidence level does not satisfy the confidence level the system may determine that there is no speech in the audio input.

Once a wakeword/beginpoint is detected, the device 110 may begin sending audio data to the server 120. The server 120 will continue speech processing on the audio data until an endpoint is detected. The audio data from the beginpoint to the endpoint is thus considered by the system 100 when performing the speech processing for the utterance.

In certain configurations, the process for endpointing has been similar to the process for beginpointing as discussed above. One difference between endpointing and beginpointing, however, is that during endpointing, the system has some knowledge of the contents of the utterance that is being endpointed. Thus, while beginpointing may sometimes occur when there is no prior speech, endpointing occurs when there is prior speech, namely the speech of the utterance whose endpoint is being detected.

Further, one drawback to certain VAD or other techniques that rely solely on pause length, is that they have difficulty distinguishing between mid-utterance pauses, and pauses that truly indicate the end of an utterance. Further, certain systems may encounter difficulty in noisy environments where separating speech from noise impacts proper pause detection.

Once audio data corresponding to speech is identified, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called an audio feature vector, representing the features/qualities of the audio data within the frame. In one configuration each audio frame includes 25 ms of audio and the frames start at 10 ms intervals resulting in a sliding window where adjacent audio frames include 15 ms of overlapping audio. Many different features for a particular frame may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. Thus the AFE may create an audio feature vector including a variety of data representing a particular audio frame.

The speech recognition engine 258 may process the output from the AFE 256 with reference to information stored in speech/model storage (252). Alternatively, post front-end processed data (such as audio feature vectors) may be received by the device executing ASR processing from another source besides the internal AFE. For example, the device 110 may process audio data into audio feature vectors (for example using an on-device AFE 256) and transmit that information to a server across a network 199 for ASR processing. Audio feature vectors may arrive at the server encoded, in which case they may be decoded prior to processing by the processor executing the speech recognition engine 258.

The speech recognition engine 258 attempts to match received audio feature vectors to language phonemes and words as known in the stored acoustic models 253 and language models 254. The speech recognition engine 258 computes recognition scores for the audio feature vectors based on acoustic information and language information. The acoustic information is used to calculate an acoustic score representing a likelihood that the intended sound represented by a group of audio feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match audio feature vectors to phonemes, for example using Hidden Markov Models (HMMs) to determine probabilities that audio feature vectors may match phonemes. Sounds received may be represented as paths between states of the HMM and multiple paths may represent multiple possible text matches for the same sound. Instead of (or in addition to) phonemes, senons may be used as an acoustic unit. A senon is an acoustic realization of a phoneme. Each phoneme may have a number of different sounds depending on its context (e.g., the surrounding phonemes). While English may have approximately 50 phonemes it has several thousand senons. Use of senons in ASR processing may allow for improved ASR results.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and NLU storage 273. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 may include a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU storage 273). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

Figure 3:
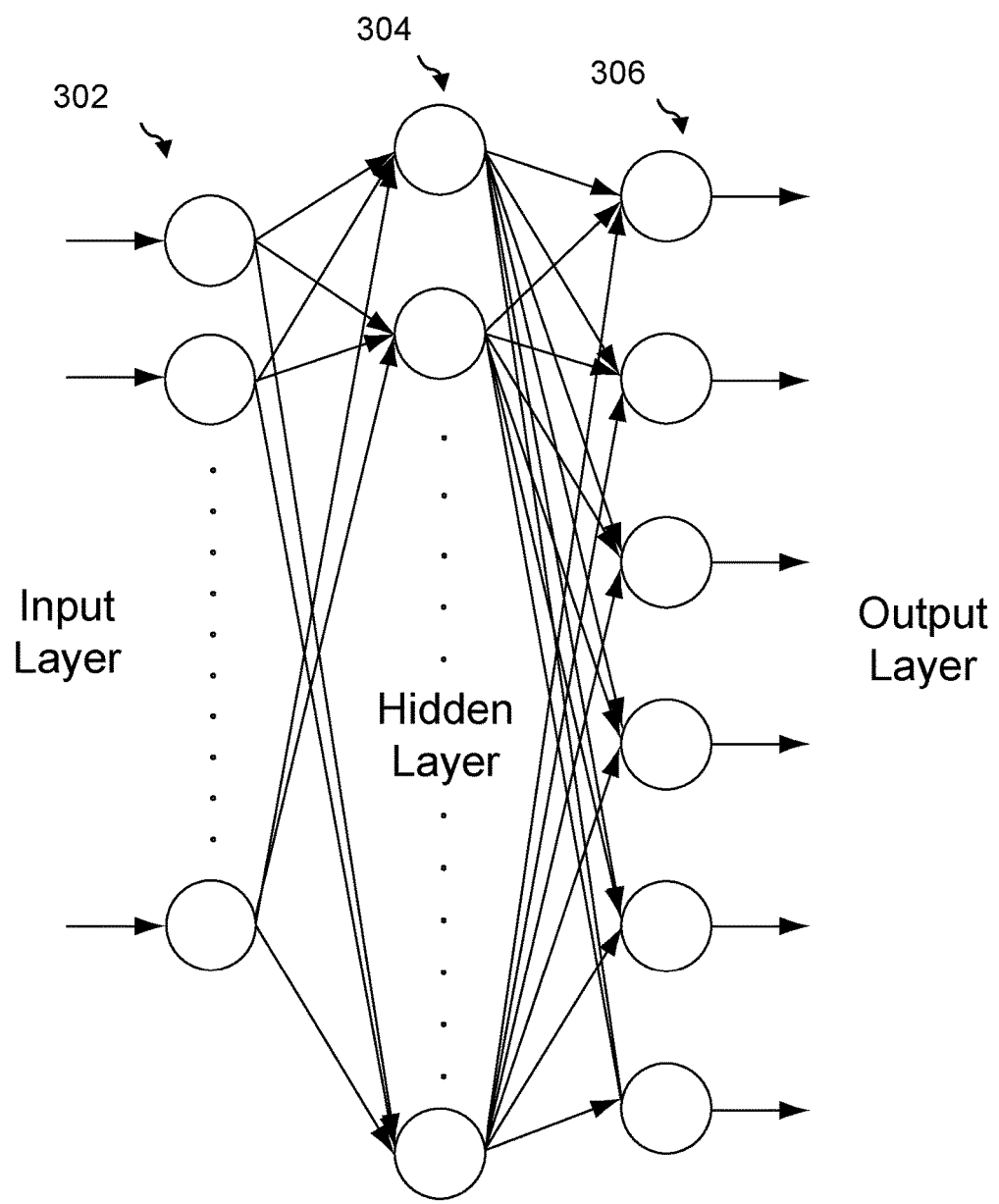
FIG. 3 illustrates a neural network for speech recognition according to embodiments of the present disclosure.

Neural networks may be used to perform ASR processing including acoustic model processing and language model processing. An example neural network for ASR is illustrated in FIG. 3. A neural network may be structured with an input layer 302, a middle layer 304, and an output layer 306. The middle layer may also be known as the hidden layer. Each node of the hidden layer is connected to each node in the input layer and each node in the output layer. Although illustrated in FIG. 3 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 4:
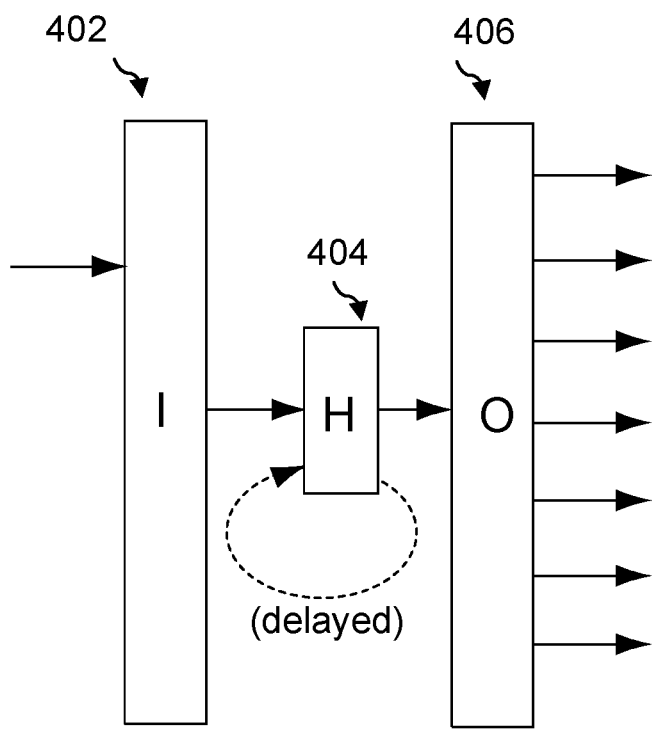
FIG. 4 illustrates a neural network for speech recognition according to embodiments of the present disclosure.

In one aspect, the neural network may be constructed with recurrent connections such that the output of the hidden layer of the network feeds back into the hidden layer again for the next set of inputs. Such a neural network is illustrated in FIG. 4. Each node of the input layer 402 connects to each node of the hidden layer 404. Each node of the hidden layer 404 connects to each node of the output layer 406. As illustrated, the output of the hidden layer 404 is fed back into the hidden layer for processing of the next set of inputs. A neural network incorporating recurrent connections may be referred to as a recurrent neural network (RNN).

In the case where an acoustic model uses a neural network, each node of the neural network input layer may represents an acoustic feature of an audio feature vector of acoustic features, such as those that may be output after the first pass of performing speech recognition, and each node of the output layer represents a score corresponding to a subword unit (such as a phoneme, triphone, etc.) and/or associated states that may correspond to the sound represented by the audio feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 4, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

As noted above, during speech recognition, an ASR module 250/speech recognition engine 258 may utilize acoustic models 253 to determine possible phonemes or other phonetic units that match the incoming audio data feature vectors. The probable phonemes and related states/state transitions may be formed into paths traversing a lattice of potential phonemes. Each path represents a progression of phonemes that potentially match the audio data represented by the audio feature vectors. One path may overlap with one or more other paths depending on the recognition scores calculated for each phoneme. Certain probabilities are associated with each transition from state to state. A cumulative path score may also be calculated for each path. This process of determining scores based on the audio feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 5:
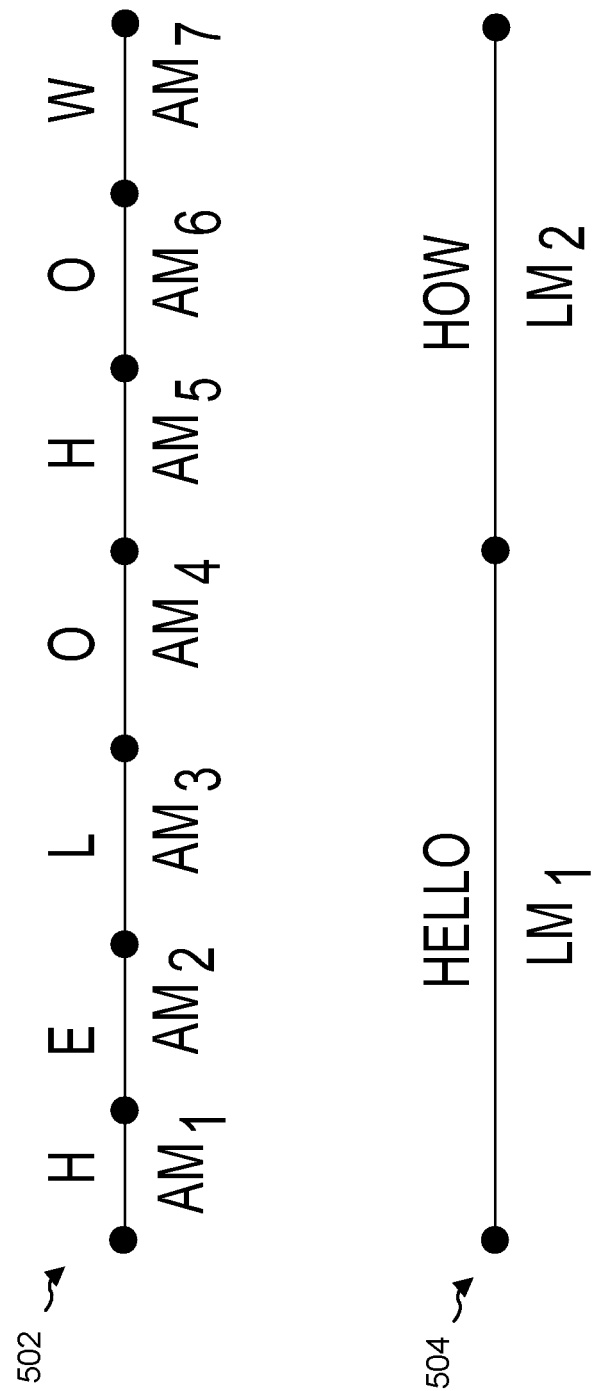
FIG. 5 illustrates phoneme processing and word processing according to embodiments of the present disclosure.

FIG. 5 illustrates the relationship between acoustic modeling and language modeling. As illustrated, each processed phoneme included in the path 502 is associated with an acoustic model score $AM_1$ through $AM_7$. The language model is then applied to associate each word in the path 504 with a language model score $LM_1$ or $LM_2$.

As part of the language modeling (or in other phases of the ASR processing) the speech recognition engine 258 may, to save computational resources, prune and discard low recognition score states or paths that have little likelihood of corresponding to the spoken utterance, either due to low recognition score pursuant to the language model, or for other reasons. Such pruned paths are considered inactive. Further, during the ASR processing the speech recognition engine 258 may iteratively perform additional processing passes on previously processed utterance portions. Later passes may incorporate results of earlier passes to refine and improve results. Paths which are being currently processed and considered as a potential output of the system are considered active hypotheses.

Figure 6:
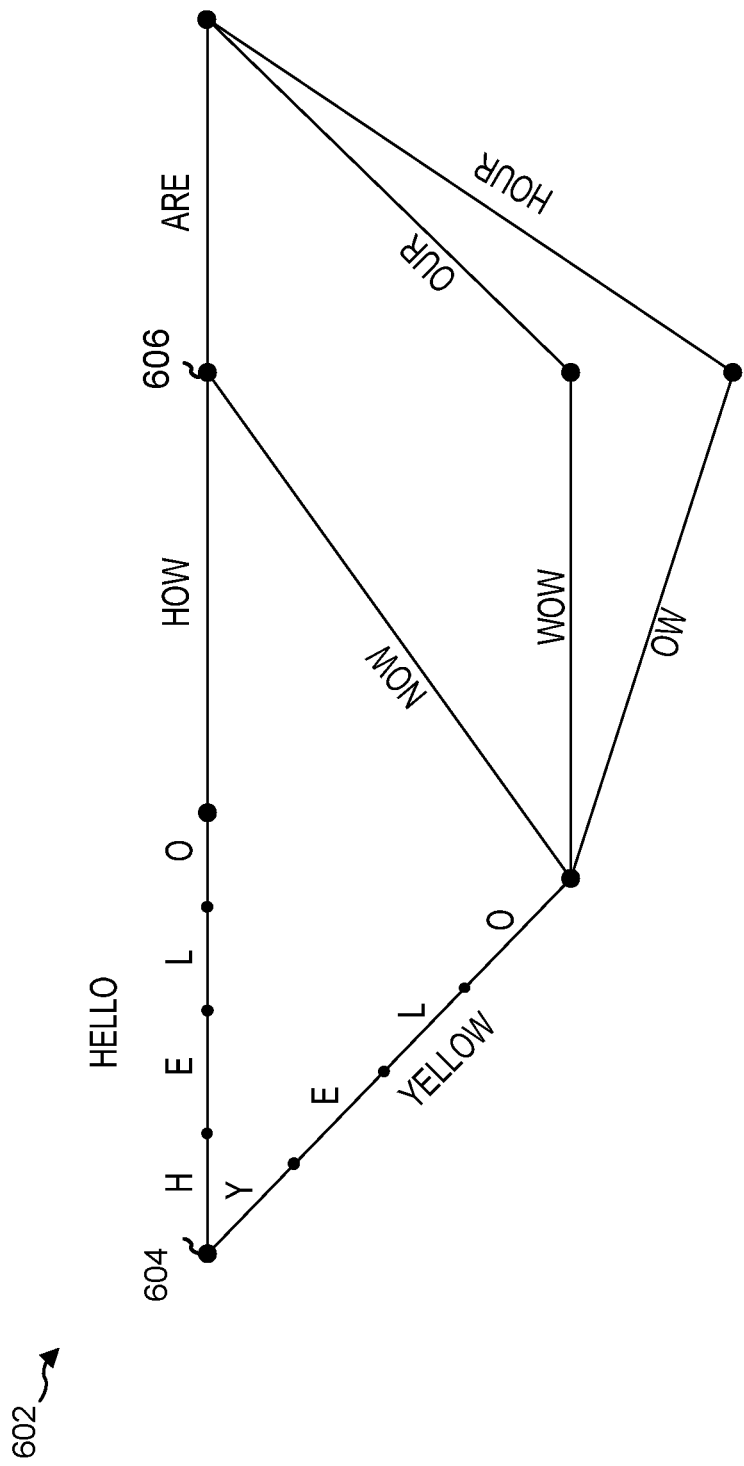
FIG. 6 illustrates a speech recognition lattice according to embodiments of the present disclosure.

The speech recognition engine 258 may combine potential paths into a lattice representing speech recognition results. A sample lattice is shown in FIG. 6. The lattice 602 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 604 and node 606 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 258 as the ASR result for the associated audio feature vectors.

Different arcs may also be associated with the same time data. For example, the arc "hello" may be associated with time data for a first group of audio frames that were processed by the speech recognition engine 258 to traverse the arc corresponding to "hello." The same time data may also be associated with the arc "yellow" as the same first group of audio frames were processed to traverse the arc "yellow" as the arc corresponding to "hello," that is the speech recognition engine 258 determined two potential words that may correspond to that first group of audio frames. The time data may be associated with those arcs for purposes of a matrix/vector representation of the lattice 602.

Figure 7:
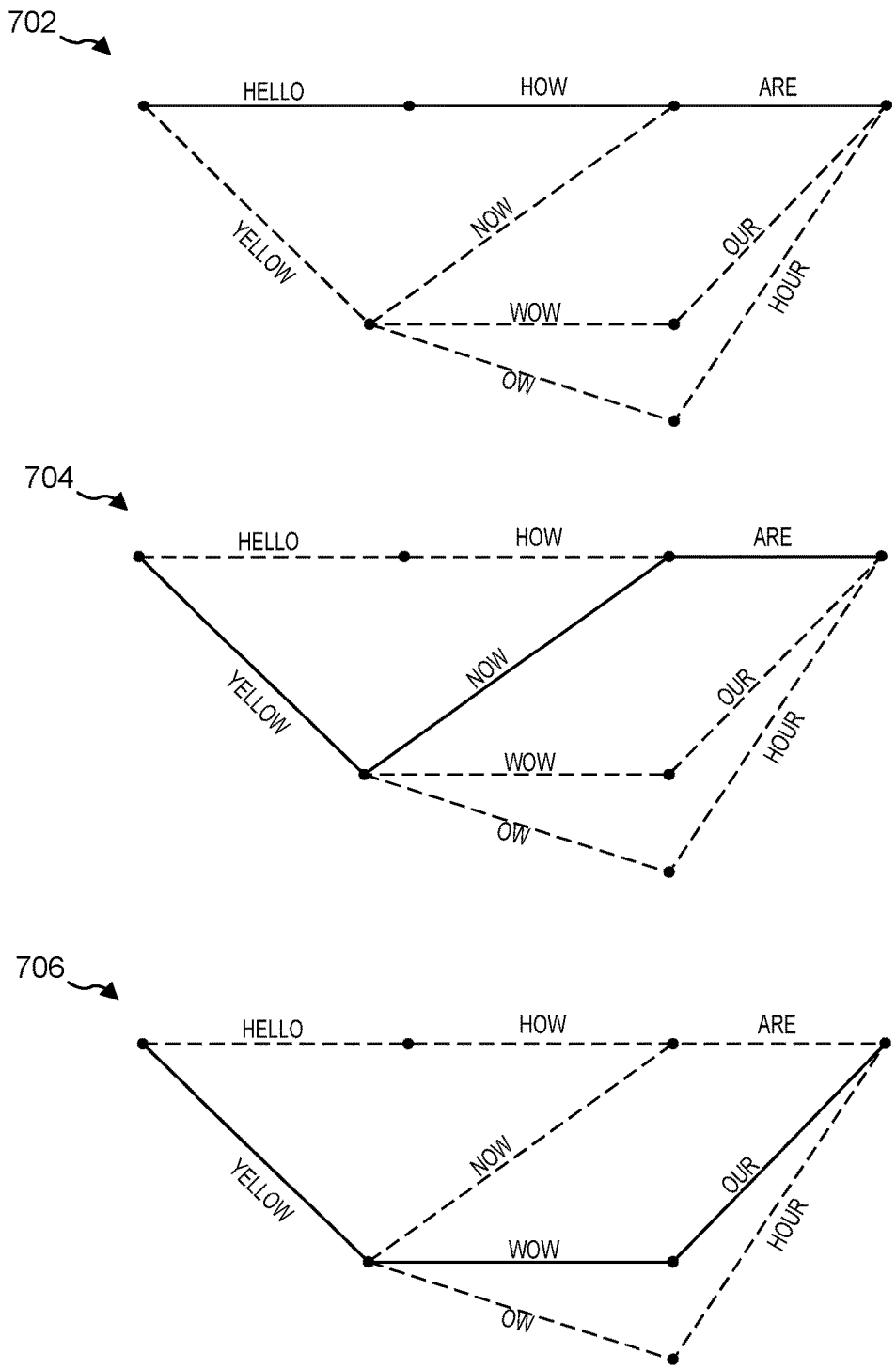
FIG. 7 illustrates different ways of traversing the lattice of FIG. 6 according to embodiments of the present disclosure.
Figure 8:
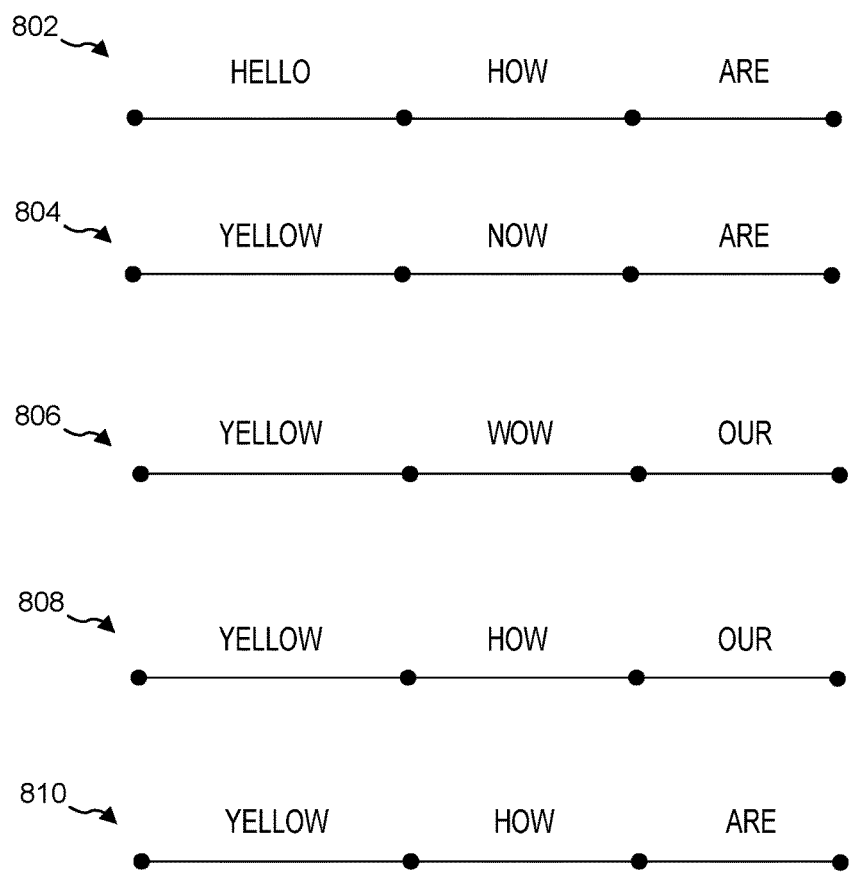
FIG. 8 illustrates an N-best list of hypotheses associated with the lattice of FIG. 6 according to embodiments of the present disclosure.

Illustrated in FIG. 7 are different potential paths along the lattice 602. As shown in FIG. 7, path 702 results in "hello how are," path 704 results in "yellow now are" and path 706 results in "yellow wow our." As can be seen, many such paths are possible even in the small example lattice 602. An example of such paths 802-810 are shown in FIG. 8. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc. As noted above, an ASR component may output an N-best list, such as the list of potential results shown in FIG. 8, may output a single top scoring answer (e.g., 802) or may output an entire lattice.

Encoding is a general technique for projecting a sequence of features into a vector space. One goal of encoding is to project data points into a multi-dimensional vector space so that various operations can be performed on the vector combinations to determine how they (or the data they contain) related to each other. For example, if usage of two sentences such as "What's the weather today?" and "Is it going to rain today?" are projected into a vector space (where each vector is populated with data points representing how or when the sentences are used), the two sentences would likely end up being close to each other in the vector projection space, thus representing the similar usage of the two sentences. It can be valuable to encode certain features into a vector space to perform various operations.

In mathematical notation, given a sequence of feature data representations $x_1, \ldots x_n, \ldots x_N$, with $x_n$ being a D-dimensional vector (where D represents a configurable number of specific values in each feature data representation), an encoder $E(x_1, \ldots x_N)=y$ projects the feature sequence to y, with y being a F-dimensional vector. F is a fixed length of the vector and is configurable depending on user of the encoded vector and other system configurations. For example, F may be between 100 and 1000 values for use in speech processing, but any size may be used. Any particular encoder 950 will be configured to output vectors of the same size, thus ensuring a continuity of output encoded vector size from any particular encoder 950 (though different encoders may output vectors different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder E may be implemented as a recurrent neural network (RNN), for example as an long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:
 linear, one direction (forward or backward),
 bi-linear, essentially the concatenation of a forward and a backward embedding, or
 tree, based on parse-tree of the sequence, In addition, an attention model can be used, which is another RNN or DNN that learns to "attract" attention to certain parts of the input. The attention model can be used in combination with the above methods of consuming the input.

Figure 9:
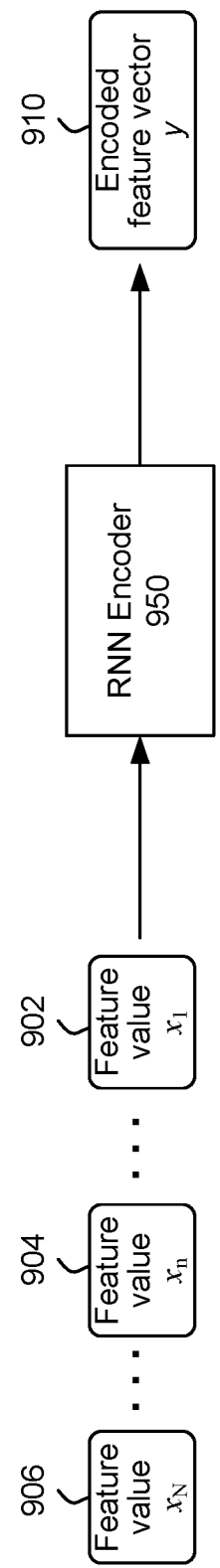
FIG. 9 illustrates operation of an encoder according to embodiments of the present disclosure.

FIG. 9 illustrates operation of the RNN encoder 950. The input feature value sequence, starting with feature value $x_1$ 902, continuing through feature value $x_n$ 904 and concluding with feature value $x_N$ 906 is input into the RNN encoder 950. The RNN encoder 950 may process the input feature values as noted above. The RNN encoder 950 outputs the encoded feature vector y 910, which is a fixed length feature vector of length F. An encoder such as 950 may be used with speech processing as indicated below.

For ASR processing the base input is typically audio data in the form of audio feature vectors corresponding to audio frames. As noted above, typically acoustic features (such as log-filter bank energies (LFBE) features, MFCC features, or other features) are determined and used to create audio feature vectors for each audio frame. It is possible to feed audio data into an RNN, using the amplitude and (phase) spectrum of a fast-Fourier transform (FFT), or other technique that projects an audio signal into a sequence of data. If alignment of the acoustic features exists, it may be added as an additional input. The alignment information can be either provided as a one-hot vector using the Viterbi alignment, or as a probability distribution over all possible states using a Baum-Welch alignment. Alignments can be provided at the level of senons, phonemes, or any other level suitable for the application.

For NLU processing the base input is typically text in the form of word sequences. A word sequence is usually represented as a series of one-hot vectors (i.e., a Z-sized vector representing the Z available words in a lexicon, with one bit high to represent the particular word in the sequence). The one-hot vector is often augmented with information from other models, which have been trained on large amounts of generic data, including but not limited to word embeddings that represent how individual words are used in a text corpus, labels from a tagger (e.g., part-of-speech (POS) or named entity tagger), labels from a parser (e.g., semantic or dependency parser), etc.

To encode a word sequence using an RNN, for example, the RNN encoder is presented with each word of the sequence one by one. The RNN processes the first word, then the second word, and so on. The RNN has mechanism to preserve its state which has all the information from all previous states. Thus, for each word the RNN processes the word and its internal state, thus operating in a recurrent fashion. After the last word, the final state is a representation of the entire vector corresponding to the word sequence. Now the word sequence is represented as a fixed size vector (i.e., the encoder output) in a vector space and operated on accordingly.

The encoder RNN may be trained using known techniques, for example the stochastic gradient descent (SGD) method with the backpropagation-through-time (BTT) algorithm to propagate an error signal through the sequence thereby learning the parameters of the encoder network.

A classifier is a known machine learning based tool to classify inputs into certain configured classes. A classifier may be trained in a manner to use the RNN encoded vectors discussed above. Thus, a classifier may be trained to classify an input set of features $x_1, \ldots N$ into a fixed number of classes $1 \ldots C$ (where C may be two, and the classifier may be configured to simply classify an input feature vector into one category or the other). To configure a classifier to operate on RNN encoded data a DNN with a softmax layer and an RNN-encoder may be used. Depending on the output size a hierarchical softmax layer can be used as known in the art. The DNN takes the RNN-encoder output as input and produces a probability distribution over all classes where the highest scoring class may be selected. In mathematical notation, given a sequence $x_1, \ldots x_N$, and an encoder E, the classifier H may be expressed as:

$$H_E(x_1, \ldots x_N) := \operatorname{argmax} p(c|E(x_1, \ldots x_N)) \quad (1)$$

where p(c|y) is implemented as a DNN.

Encoder RNN E and classifier H may be trained jointly using the SGD method with the cross-entropy objective function and the backpropagation-through-time (BTT) algorithm. Instead of SGE, any other machine learning technique that applies to learning neural networks can be applied to BTT. The encoder E may be trained on sample sequences of feature data. The classifier H may be trained on example feature vectors output together with encoder E. Known machine learning techniques may be used to train H and E, for example using a gradient feedback technique to update parameters/weights in H and E.

The above encoding technique may be used to improve a number of speech processing tasks. In particular, it may be used to encode a reference portion of speech, that may then be used for certain downstream tasks, for example speech detection and speech recognition. Speech detection is the task of determining whether input audio includes speech or non-speech (i.e., silence, noise, etc.). Further, speech detection may also include the task of determining whether detected speech is a "desired" speech, as in speech from a particular person as opposed to speech from any other person (or noise). Speech recognition is the task of determining what words are detected in input audio. Speech recognition may also include the task of determining what words in the input audio correspond to the "desired" speaker rather than words being spoken by undesired speakers, such as speech from other individuals in a room or otherwise detectable by a speech processing component.

To assist speech detection and speech recognition, reference audio data may be used to help the system determine what input speech corresponds to a desired speaker. Such reference audio data (also referred to as anchor audio data) may correspond to speech of the desired speaker (i.e., an anchor audio segment). By using the encoder techniques above, a system may compute an embedding of reference audio data in a fixed-size vector-space that helps a speech detector or a speech recognizer to distinguish desired speech from undesired speech and/or noise.

For example, in a certain circumstance the system may desire (or be configured to) only detect/recognize speech from speaker S. Thus, given a reference speech sample from speaker S, the audio frames for the speech same $x'_1 \ldots x'_m$ may be obtained. These frames may be referred to as the reference audio data.

The reference speech sample may be obtained in a number of ways. In a first example, for a particular incoming utterance where a user speaks an interaction with the system, the utterance may begin with a wakeword. For example, "Alexa, play music" may be an utterance to the system to play music where "Alexa" is the wakeword. In such a situation, the system may want to isolate the speech of the speaker of the wakeword as this individual is the individual likely to be commanding the system, and thus becomes the desired speaker for purposes of speech detection/ASR. Thus, for a wakeword triggered interaction the system may determine the start and end time of the wakeword and thus may isolate audio data corresponding to the speaking of the wakeword audio. That isolated audio data may be used as the reference audio data.

Figure 10:
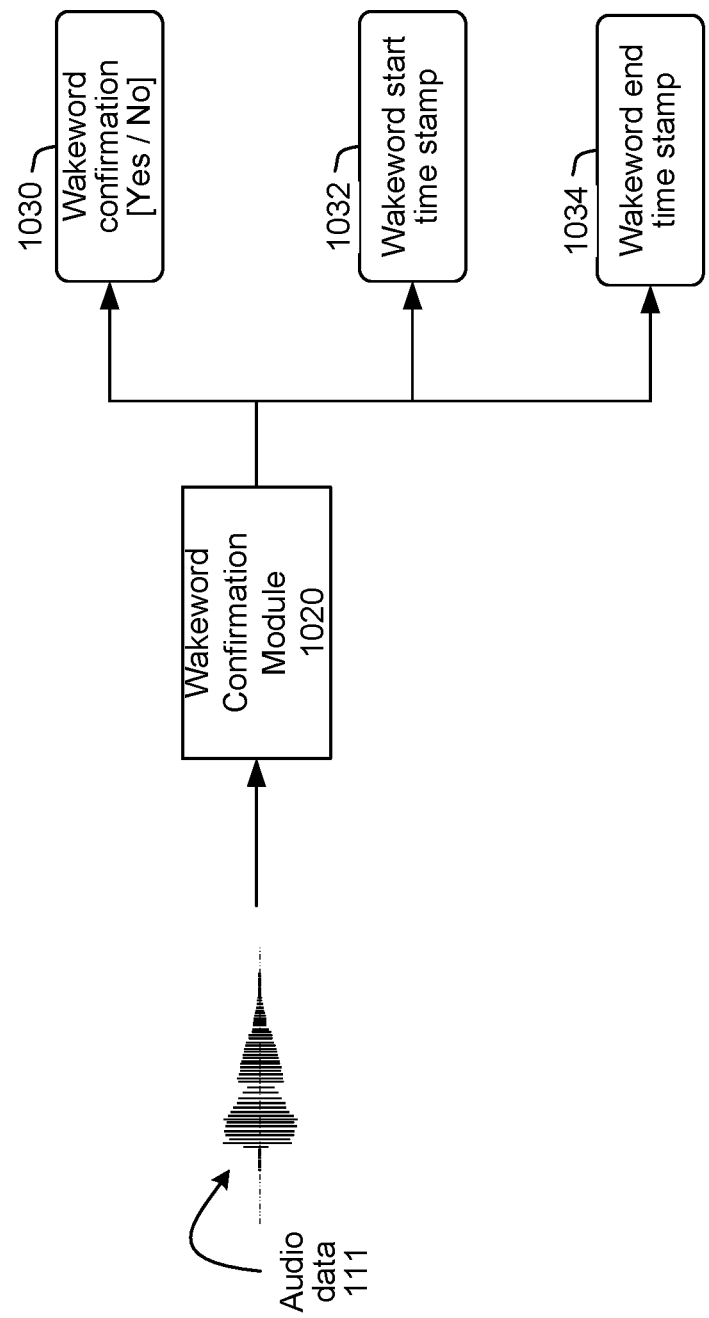
FIG. 10 illustrates identifying a wakeword in input audio data according to embodiments of the present disclosure.
Figure 11:
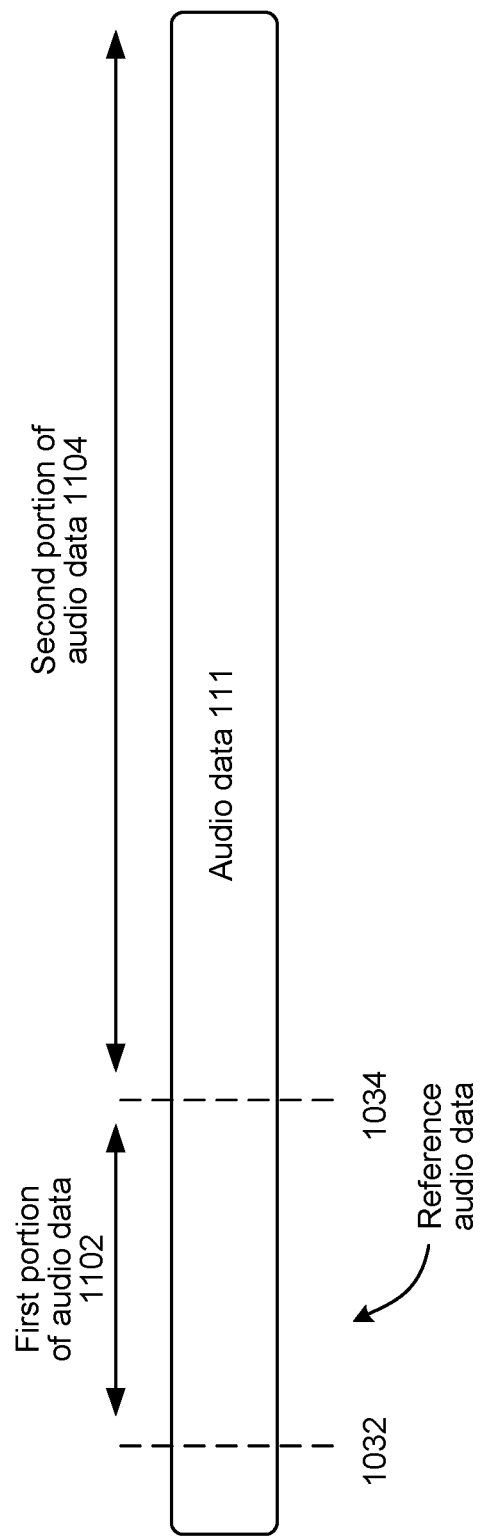
FIG. 11 illustrates identifying reference audio data from a wakeword portion of input audio data according to embodiments of the present disclosure.

For example, as illustrated in FIG. 10, input audio data 111 may be processed by a wakeword confirmation module 1020 to identify a wakeword in the input audio data 111 using wakeword/keyword detection techniques, such as those described above. The wakeword confirmation module 1020 may then output a confirmation 1030 that the wakeword is detected or not detected in the input audio data 111. If the wakeword is detected, the input audio data may be passed to a downstream component (such as an ASR module 250) for further processing. Also, the wakeword confirmation module 1020 may determine timestamps corresponding to the wakeword start time 1032 and wakeword end time 1034 in the input audio data 111. The timestamps 1032 and 1034 may be indicators of start/end frames or audio feature vectors corresponding to the wakeword or other indicators of start/end time for the wakeword/. Thus the timestamps 1032 and 1034 may thus be used to demarcate the wakeword portion in the input audio data 111 as illustrated in FIG. 11.

The wakeword portion of the audio data may include a first portion of the audio data. As shown in FIG. 11, the start timestamp 1032 may indicate the start of the wakeword and the end timestamp 1034 may indicate the end of the wakeword. Thus the first portion of audio data 1102 may start at the start location and end at the end location and may include a first plurality of audio feature vectors in between. (Note that the input audio data 111 may include some audio data that occurs prior to the wakeword due to buffering or other processing configurations. Such audio data may be processed or may be ignored as part of speech processing.) Thus the audio data 111 may be divided into at least two portions, the first portion 1102 that includes the wakeword and the second portion 1104 that includes further audio data. The non wakeword portion of the input audio data 111 is sometimes referred to as the payload, which may be the focus of downstream speech processing. The payload may include the second portion, a third portion, fourth portion, etc. The individual portions may be comprised of audio feature vectors. The audio feature vectors making up the first portion 1102 (i.e., the feature vectors that correspond to the wakeword) may be selected as the reference audio data.

In a second example, a wakeword may not necessarily begin a particular incoming audio data signal, such as in a non-wakeword system or in an utterance that is part of an ongoing session with the system where the wakeword is not necessary. In such a situation an ASR process may make a first pass at recognizing words in input audio. The system may determine that some first portion of that input audio corresponds to the desired speaker such as the first word, the first two words, the first three words, etc. That early portion of the input audio may be determined to be the reference audio and the frames corresponding to the early portion may be the reference audio data. That reference audio data may then be used as detailed below for further processing, such as speech detection, a second pass at ASR, or the like. Thus, in the illustration of FIG. 11 the first portion of audio data 1102 may still be used as the reference audio data even if it does not include the wakeword.

Figure 12:
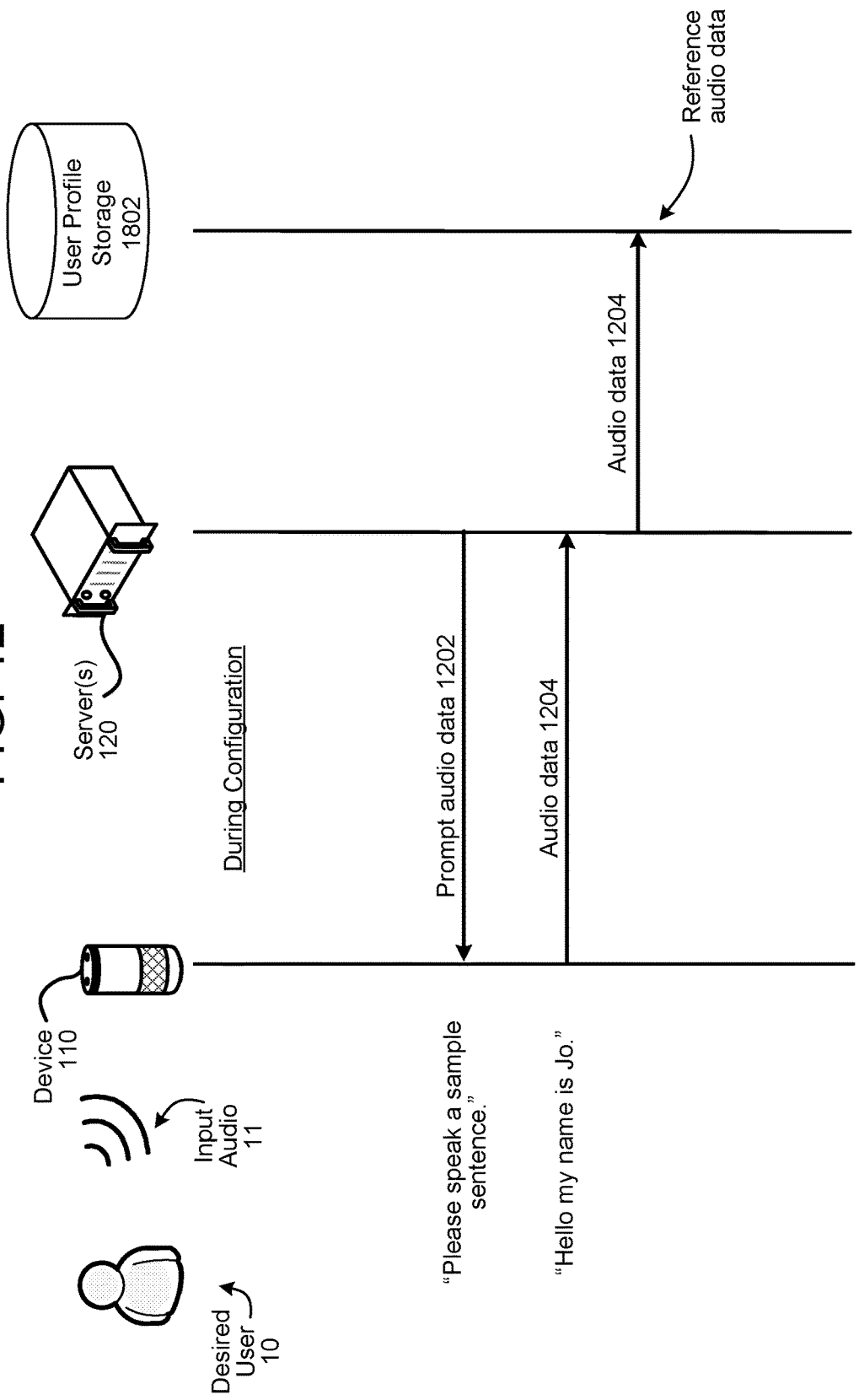
FIG. 12 illustrates identifying reference audio data from pre-stored audio data according to embodiments of the present disclosure.

In a third example, reference audio data may be taken from a previous recording from the desired speaker, for example a recording taken during a voice training session. For example, as shown in FIG. 12, during a configuration session a system server 120 may send prompt audio data 1202 to a local device 110. The prompt audio data may include, for example, audio data corresponding to a prompt to a user 10 to "Please speak a sample sentence." The local device 110 may output audio corresponding to the prompt. The user 10 may then speak a sample sentence such as "hello, my name is Jo." The audio 11 corresponding to the sample sentence may be captured by the device 110 and converted into audio data 1204 which the local device 110 sends to the server 120. The audio data 1204 may then be sent to user profile storage 1802 to be stored in a user profile associated with user 10. For further commands coming from a device associated with user 10 (such as device 110 or perhaps a phone, tablet, or other device associated with the user profile of user 10), the audio data 1204 may be used as the reference audio data.

Figure 13:
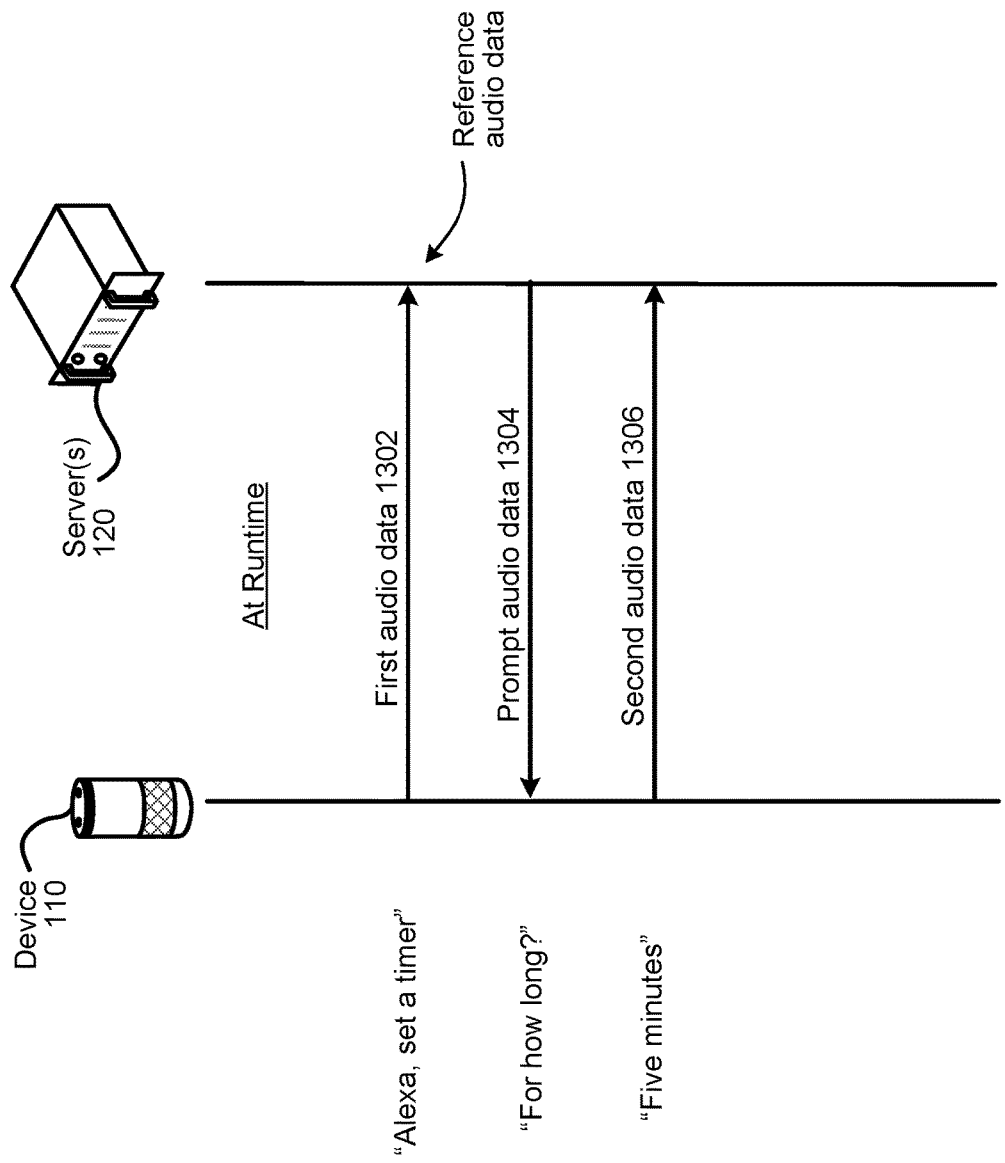
FIG. 13 illustrates identifying reference audio data from first input audio data according to embodiments of the present disclosure.

In a fourth example, the system may make an assumption that the speaker who spoke a previous sentence to the system (for example, the previous utterance received by a particular input device) is the desired speaker. Thus, a portion of the input audio data from the previous sentence may be used as the reference audio data. For example, as illustrated in FIG. 13, at runtime a device 110 may capture audio corresponding to a first utterance, such as "Alexa, set a timer." The device 110 may send first audio data 1302 corresponding to the first utterance to the server 120 for speech processing. The server 120 may perform speech processing on the first audio data 1302 and may determine that further information is needed to execute a command. The system may then determine and send prompt audio data 1304 to be output by device 110, such as "for how long?" The device 110 may then capture second audio corresponding to a second utterance, such as "five minutes." The device 110 may send second audio data 1306 corresponding to the second utterance to the server 120 for speech processing. The server 120 may know that the second audio data 1306 is part of a same session or exchange as the first audio data 1302 and may use the first audio data 1302 as the reference audio data.

Figure 14:
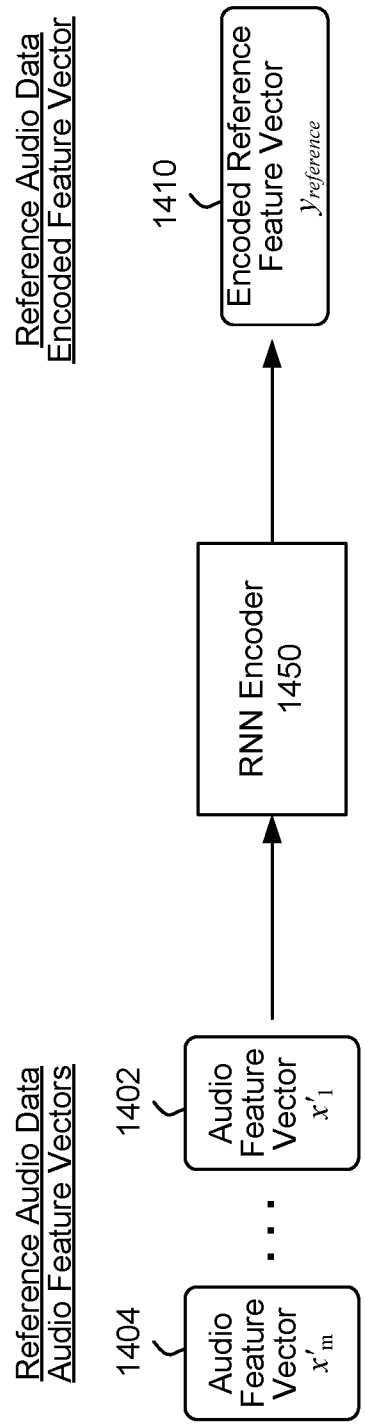
FIG. 14 illustrates encoding reference audio data into a feature vector according to embodiments of the present disclosure.

Once determined, the reference audio data (including feature vectors $x'_1 \ldots x'_m$) may be encoded by an encoder to result in encoded reference audio data $E(x'_1 \ldots x'_m)$. This encoded reference audio data (which may be an encoded feature vector) may then be used for speech detection and/or speech recognition. For example, as shown in FIG. 14, the audio features vectors for the reference audio data may include audio feature vector $x'_1$ 1402 through audio feature vector $x'_m$ 1404. In the example of the reference audio data corresponding to the wakeword, audio feature vector $x'_1$ 1402 may correspond to the wakeword start time 1032 and audio feature vector $x'_m$ 1404 may correspond to the wakeword end time 1034. The audio feature vectors may be processed by RNN encoder 1450 to create encoded reference feature vector $y_{reference}$ 1410, which by virtue of the RNN encoding represents the entire reference audio data from audio feature vector $x'_1$ 1402 to audio feature vector $x'_m$ 1404 in a single feature vector. The RNN encoder 1450 may be configured to process a first input audio feature vector (e.g., input audio feature vector $x'_1$ 1402) first, or may be configured to process input audio feature vectors in a reverse order (e.g., input audio feature vector $x'_m$ 1404 first) depending on system configuration. The RNN encoder 1450 may include a gated recurrent unit (GRU), long short term memory (LSTM) RNN or other possible model that has backward looking (e.g., recurrent) properties.

The reference audio data may be encoded using an encoder 1450 with log-filterbank energy (LFBE) features that are normalized by applying conventional recursive log-amplitude mean subtraction (LAMS). The encoder may be configured to capture a fixed length vector representation of the desired speech segment. This vector may then be used to determine whether further audio data matches the speaker of the reference audio data. For example, the reference feature vector 1410 may be used with the features of incoming audio data of an utterance to make a frame-level decision on whether the frame includes desired speech as explained below.

As noted above, input audio data may include a sequence of audio frames where each frame is made of a sequence of features derived from an acoustic signal. Typical features include log filterbank energies (LFBE), mel-frequency cepstral coefficients (MFCCs), perceptual linear prediction (PLP), or any other meaningful features that can be derived from the audio signal including the digitalized audio signal itself. One goal of speech detection is to label each input audio frame as (1) desired speech, (2) non-desired speech or (3) non-speech. In particular, the system may assign different probabilities for each audio frame as corresponding to one of the three above categories. Thus, downstream processes may use the labels and/or different probabilities to do different things with desired speech versus non-desired speech versus non-speech.

Speech detection in a real-time system (i.e. a system that classifies input audio frames reasonably quickly as they come in without undue latency) may be causal. That is, the system may consider past audio frames when classifying a current frame but may not consider a large number of future audio besides a look-ahead window of a small fixed size.

A frame-wise speech detector may have the form $H(n; x_1 \ldots x_{n+d})$ and may predicts the probability of $Pr(n$-th frame is "desired speech"$|x_1 \ldots x_{n+d})$. H can be implemented in different ways, a common state-of-the-art choice is to implement H as a (deep) neural network (DNN) or recurrent neural network (RNN). H may also be implemented to use the encoded reference audio data vector as an input. Thus, the system may use the encoder approach to project the anchor segment into a fixed size vector space, which is then fed as an additional feature into the frame-wise speech detector:

$$H(n; x_1 \ldots x_{n+d}, E(x'_1 \ldots x'_m)) \qquad (2)$$

where H considers as inputs the encoded reference audio data vector, the particular audio frame to be classified/labeled, a certain number of audio frames before the particular audio frame, and a certain number of audio frames after the particular audio frame. Thus, a sliding window of audio frames may be used to provide some context to the classifier H when labeling any particular audio frame.

Figure 15:
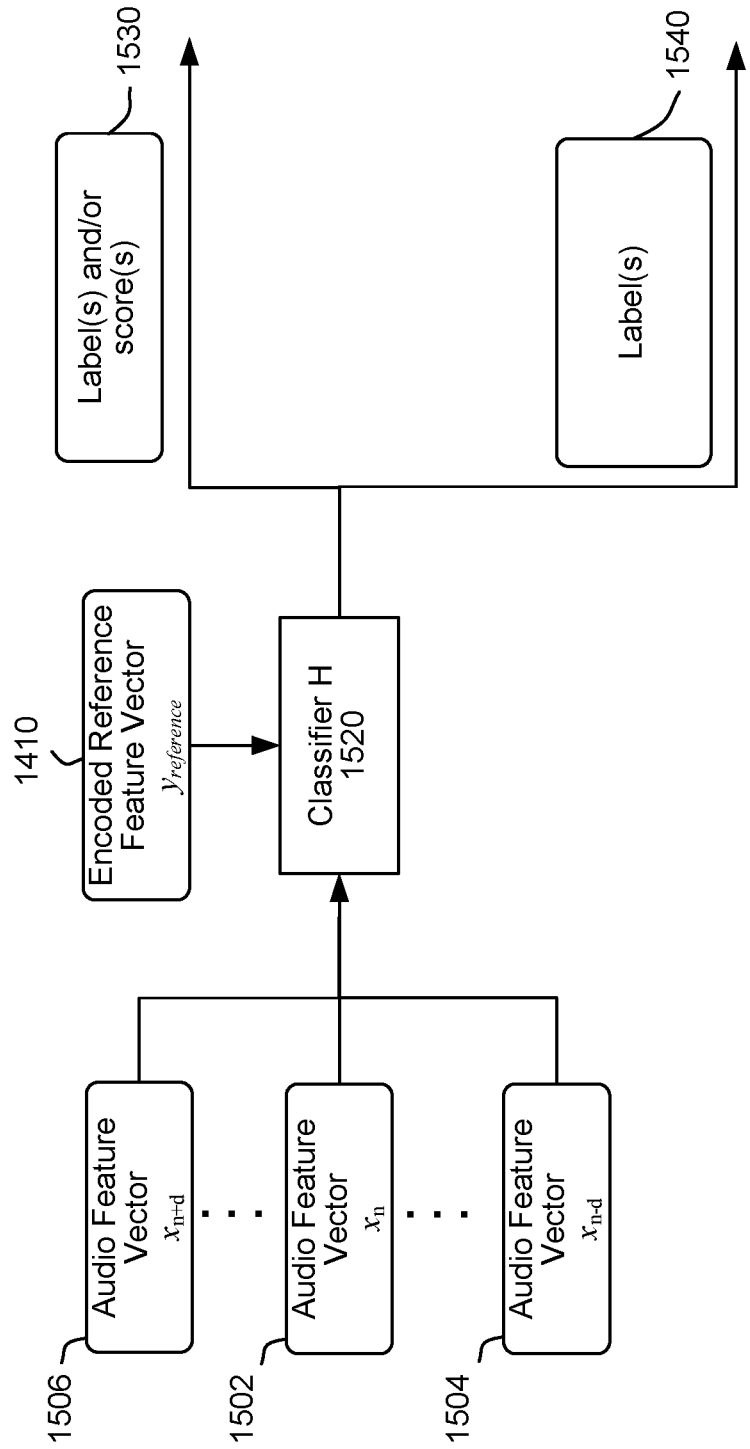
FIG. 15 illustrates using a reference feature vector to classify input audio data according to embodiments of the present disclosure.

As shown in FIG. 15, for a particular audio frame n, the audio feature vector $x_n$ 1502 corresponding to frame n is fed into the classifier H 1520 along with several audio feature vectors that appear in the input audio data before audio feature vector $x_n$ (for example, audio feature vector $x_{n-d}$ 1504 through audio feature vector $x_{n-1}$ (not illustrated)) and several audio feature vectors that appear in the input audio data after audio feature vector $x_n$ (for example, audio feature vector $x_{n+1}$ (not illustrated) through feature vector $x_{n+d}$ 1506). In one example the sliding window size is five frames, thus the feature vector for frame n is fed in with two audio feature vectors before audio feature vector $x_n$ and two audio feature vectors after audio feature vector $x_n$. Other window sizes may also be configured.

The output of the classifier H may include different scores 1530 for each desired label, for example a first score that the particular audio data frame corresponds to desired speech, a second score that the particular audio data frame corresponds to undesired speech, and a third score that the particular audio data frame corresponds to non-speech. Alternatively, the classifier H may simply a label 1540 for the particular audio frame as to which category the particular frame corresponds to (e.g., desired speech) along with a particular score. This implementation may be considered to be giving the particular audio frame a first probability of 1, a second probability of 0 and a third probability of 0. The classification/labeling process may be repeated for a plurality of input audio frames. The label may include an indication that the particular audio frame n (and/or audio feature vector $x_n$) corresponds to desired speech (i.e., speech from the same speaker as the reference audio data), undesired speech (i.e., speech from a different speaker as the reference audio data), or non-speech.

While certain system configurations may result in classifier H 1520 being trained to output a label corresponding to the particular audio feature vector $x_n$, in other configurations the output label (and/or score) may correspond to the group of feature vectors input into the classifier H 1520. Thus the system may evaluate multiple frames worth of data as a group (rather than frame by frame with the sliding window arrangement). The output label and/or score may then be used for various downstream purposes.

$E(x'_1 \ldots x'_m)$ contains information about how the desired speech "looks" like, and $x_1 \ldots x_{n+d}$ contains the information how the current speech "looks" like. Thus the encoded reference audio data vector provides a reference point for H to classify each audio frame with a probability that the audio frame corresponds to the desired speech.

H may be implemented either as a DNN or RNN (can be an LSTM-RNN or GRU-RNN or any other RNN variant). H and E may be trained jointly using the method of stochastic gradient descent (SGD) with the backpropagation-through-time (BTT) algorithm or any other suitable learning algorithm. At training time frames containing desired speech are marked as positive examples, whereas other frames are marked as negative examples (i.e., corresponding to non-desired speech or non-speech). Classifier H 1520 may be trained at the same time as RNN Encoder 1450 so that the Encoder 1450 produces reference feature vectors that are useful for the classifier 1520 and so the classifier 1520 learns how to classify inputs using vectors in the form output by RNN Encoder 1450.

In other embodiments of the disclosure, the encoded reference audio data may be used in other ways in determining speech detection. For example, the system may estimate the mean of the reference audio data in the log-filterbank energy (LFBE) domain, then subtracting it from all subsequent audio feature vectors of the same utterance in order to expose energy level differences relative to the reference audio data. This approach may be referred to as log-amplitude mean subtraction (LAMS). The normalized features are then used for feed-forward deep neural network (DNN) based classification. Thus, for reference audio data (which may correspond to a wakeword or may correspond to other speech from a desired user), the system may extract sufficient information that is specific to the desired user that can be used by subtracting the information from input audio data to sufficiently test whether the input audio data corresponds to speech from the desired user.

One technique for making a speech processing system robust to noisy conditions is cepstral mean subtraction. Cepstral coefficients are created by computing the short-time Fourier transform (STFT) of the time-domain audio signal, combining the filterbank energies into a mel-spaced filterbank, taking the logarithm of the coefficients, and then transforming them with a discrete cosine transform (DCT). The present system may use log filterbank energies (LFBEs) which follow the same processing chain as cepstral coefficients but do not have the final DCT transformation applied to them. The normalization technique may be LAMS.

LAMS helps normalize the speech transfer function characteristics. Modeling the speech signal as $X_t = S_t * H_t$, where $X_t$, $S_t$, and $H_t$, are the time-domain far field audio data ($X_t$), speech signal ($S_t$), and transfer function ($H_t$). With a stationary transfer function, an estimate of the speech signal can be retrieved as:

$$\log(S_{k,n}) \approx \log(X_{k,n}) - \log \hat{H}_k \qquad (3)$$

The transfer function can be estimated in offline and online fashions. In the offline method, the per-feature mean is first calculated over the desired speech segment ($\Sigma_{n=1}^{N} X_{k,n}$). Then the per-feature means are subtracted from the original features.

The above system works well in environments where the speech and noise characteristics are relatively stationary throughout the analyzed segment. In online system or more dynamic acoustic environments, the mean statistics are instead continually updated over time. One popular choice is to update the time-varying mean estimation using an autoregressive/recursive update.

$$\hat{H}_{k,m+1} = \alpha \hat{H}_{k,m} + (1-\alpha) X_{k,m} \text{ for } 0 < \alpha \leq 1 \qquad (4)$$

$\alpha$ is chosen to allow the estimator to capture the static or slowly-changing environmental characteristics without capturing the faster-moving speech characteristics. A continually-updating online LAMS estimate can transform desired and interfering speech features look more similar, which is in opposition to our goal. For example, in the case where there is an anchor word followed by interfering speech and then desired speech, the recursive LAMS causes energy peaks in interfering and desired speech to overlap.

The LAMS method may allow the system to keep the features in the desired range and for better distinguishing features between the desired and interfering speech. For the mean estimator, the system may compute the average feature values over the reference audio data. For the task of recognizing speech from the desired talker, this constraint is advantageous. The reference audio data may be used as an example of the desired talker's speech, and then by subtracting the LAMS, the system may shift the features corresponding to the desired speaker closer to being zero-mean. This allows the system to train a classifier, e.g., a DNN, to better classify a desired talker's speech. This method can be considered a feature normalization method that depends on the characteristics of the utterance's anchor word. Such a method allows the features to be normalized in a dynamic fashion for each utterance because the LAMS is always estimated for each new reference audio data.

Thus, the system may obtain reference audio data from a desired user. The reference audio data may be audio data corresponding to a wakeword portion of a runtime utterance. The system may then estimate a mean value of the reference audio data in the LFBE domain. That mean may then be subtracted from subsequent feature audio feature vectors of the same utterance which will result in an energy level difference between the particular audio feature vector and the reference audio data. This technique may be referred to as log-amplitude mean subtraction. The energy level difference (which is normalized due to the subtraction) may then be fed into a feed-forward deep neural network (DNN) or other machine learning trained model for classification. The model may be configured to classify energy level differences as representing speech belonging to the desired user (who spoke the reference audio data) or as representing non-speech or speech belonging to a different person.

The goal of speech recognition (i.e., ASR) is to recognize spoken words corresponding to input audio data. The statistical approach to speech recognition solves the task of finding the most likely sequence of words W given the observed features $x_1, \ldots x_N$:

$$W = \text{argmax}_W p(W|x_1, \ldots x_N) \quad (5)$$

A refined goal of ASR is to recognize a desired word sequence corresponding to input audio data. The "desired" word sequence may be considered to cover any speech in input audio data or may be considered to cover speech from a desired particular person, but not speech from any other person (other speakers s). This problem may be expressed as:

$$W = \underset{W}{\text{argmax}} \underset{s_{n=1}^{N}|W}{\max} \prod_{n=1}^{N} (p(s_n|x_1 \ldots x_{n+d})/p(s_n))p(s_n|s_{n-1}) \quad (6)$$

The state $s_n$ refers to a state in an HMM modeling a word or a phone or a senon or any other subword unit. Taking the phone as example, the quantity $p(s_n=A|x_1 \ldots x_{n+d})$ is the probability estimate of phone "A" being spoken at position "n", $p(s_n=B|x_1 \ldots x_{n+d})$ is the probability estimate of phone "B" being spoken at position "n", etc. One or a few special "phones" are used to represent silence and noise.

As above with speech detection, the encoded reference audio data vector $E(x'_1 \ldots x'_m)$ may be provided as an additional input to "guide" the speech recognition system towards the desired word sequence. Thus, $$W = \text{argmax}_W p(W|x_1, \ldots x_N; E(x'_1 \ldots x'_m)) \quad (7)$$

One implementation is to make the computation of the frame-wise state probability during ASR dependent on E $(x'_1 \ldots x'_m)$:

$$p(s_n|x_1 \ldots x_{n+d}; E(x'_1 \ldots x'_m)) \quad (8)$$

Here, p may be implemented either as a DNN or RNN (can be an LSTM-RNN or GRU-RNN or any other RNN variant) and p and E are jointly trained as described above. One difference between speech detection is that in speech recognition the decision is not only made between (desired) speech and non-speech, but also between the units of speech (phones, senons, etc.). If p and E are trained on training data for which undesired speech is mapped to an existing non-speech class, or a newly defined undesired-speech class, then the approach can learn both ignoring undesired speech and improving the distinction between the units of speech and between speech and noise. If the training data does not contain any non-desired speech, then the approach is likely to learn a speaker and/or acoustic condition adaptation, i.e., improve the distinction between the units of speech and between speech and noise.

Figure 16A:
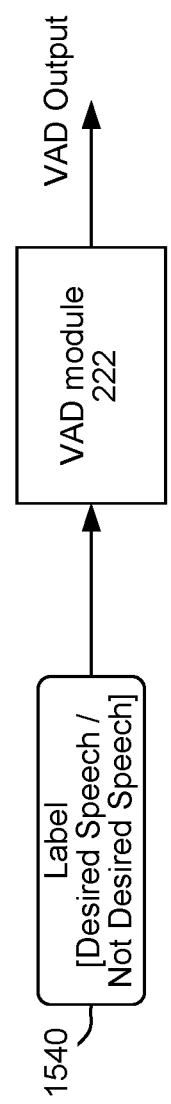
FIG. 16A illustrates performing voice activity detection using input audio data and a label corresponding to the input audio data according to embodiments of the present disclosure.

The system may use the labels/scores from the speech labeling of FIG. 15 to perform voice activity detection (VAD). For example, as shown in FIG. 16A, the label(s) 1540 (and/or score(s) 1530) corresponding to the audio feature vector 1502 may be input to VAD module 222. (The audio feature vector 1502 itself may also be input to the VAD module 222 depending on system configuration). The VAD module 222 may thus consider whether the audio feature vector is labeled as desired speech or undesired speech in whether or not to declare that voice activity is detected, thus triggering further downstream operations of the speech processing system. For example, if input audio corresponds to speech, but not necessarily to desired speech, the VAD module 222 may be configured to not declare speech detected so as not to cause the system to process undesired speech. In this manner the VAD module 222 may be trained to declare speech detected only upon a sufficient quantity of desired speech being detected.

The system may also use the labels/scores determined from the speech labelling process as an input to the ASR module for purposes of ASR. For example, as shown in FIG. 16B, the label(s) 1540 (and/or score(s) 1530) corresponding to the audio feature vector 1502 may be input to an ASR module 250 (and thus to a speech recognition engine 258). (The audio feature vector 1502 itself may also be input to the ASR module 250 depending on system configuration). The ASR module 250 may then consider the label 1540 and/or score(s) 1530 when performing ASR. For example, an audio feature vector that is labeled as corresponding to desired speech may be weighted more heavily (i.e., more likely to ultimately impact a top hypothesis) than an audio feature vector that is labeled as corresponding to undesired speech (or non-speech). For ASR purposes, the classifier H 1520 may take the form of an acoustic model, where labels/scores 1530 (or labels 1540) may correspond to a particular speech unit. For example, an acoustic model classifier H 1520 may output a list of senons (or other acoustic unit) along with corresponding scores for each particular senon (which may also correspond to an encoder 1450 that is trained to output a reference feature vector 1410 that may be used for such complex acoustic modeling). The resulting output list of senons and scores may then be used by a downstream language model or other ASR component part of ASR module 250 to produce the text of the ASR output.

Figure 17:
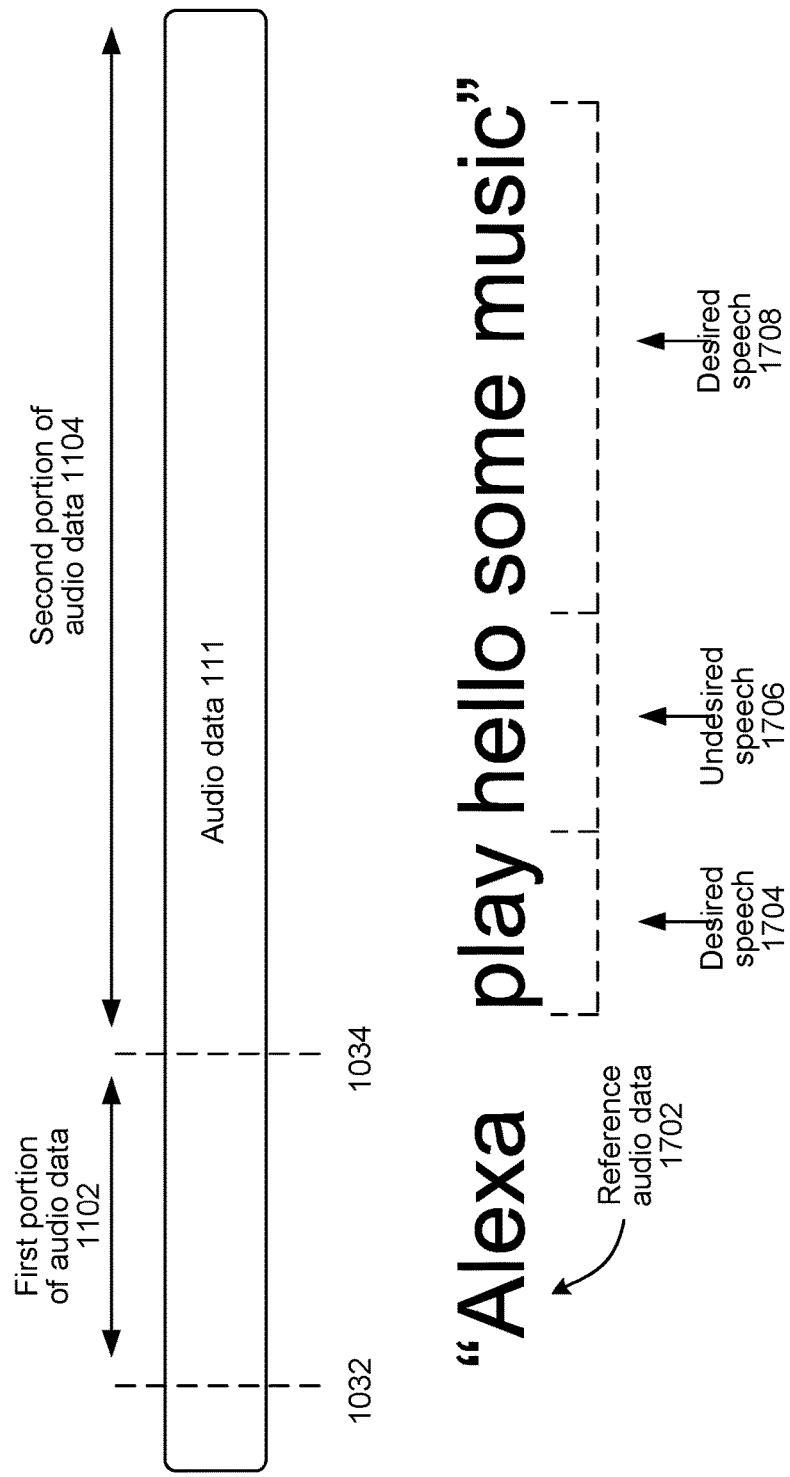
FIG. 17 illustrates classifying input audio data according to embodiments of the present disclosure.

FIG. 17 illustrates an example of classifying input audio data as desired speech or undesired speech using reference data that includes a wakeword. In this example a first user speaks an utterance "Alexa, play . . . some music." However, while the first user is speaking a second user walks into the room and says "hello." However the second user's speaking of "hello" happens in between the first user saying "play" and "some." Thus, the audio data 111 transcribed would result in text of "Alexa play hello some music." While performing NLU and further processing on such text may result in the desired action of the first user (particularly if the user wished the system to play Adele's "Hello," the first user's default music choice may be something else, thus resulting in the second user's utterance interfering with the intended command of the first user.

As shown the audio data 111 includes a first portion 1102 of audio data that includes the wakeword "Alexa" as spoken by the first user. The first portion may then be used to create a reference encoded feature vector corresponding to reference audio data 1702 that is used when classifying frames of the second portion 1104 of audio data as explained above. Using the classification technique, the system will be able to determine that the audio data corresponding to the words "play" (1704) and "some music" (1708) match the voice of the speaker of "Alexa" and thus corresponds to desired speech, while the audio data corresponding to the word "hello" (1706) does not match the voice of the speaker of "Alexa" and thus corresponds to undesired speech. The system may thus ignore the "hello" and only process the text "Alexa, play some music" as spoken by the first user.

While the system may also attempt to identify the identity of the speaker of the wakeword (or other portion of incoming audio), a technique called speaker identification, the techniques herein to label audio as desired speech/undesired speech/non-speech, and to use such labels, are separate from speaker identification in that the identity of the speaker is not needed and thus the described techniques may be performed without performing speaker identification.

Further, while the RNN encoder 1450 and classifier 1520 are illustrated as configured to encode reference audio data for purposes of classifying incoming audio data for speech detection, and thus may be located upstream of an ASR module 250, they may also be implemented as part of the ASR module 250 and as such may result in different features being included in the encoded vector for purposes of performing reference-based speech recognition. Further, the labels 1540 determined by the classifier 1520 may be used for other purposes. An endpointing module may use the labels to declare a speech endpoint. For example, if a consecutive number of frames/audio feature vectors are classified as undesired or non-speech, the endpointing module may declare that the end of the desired speech has been reached.

Figure 18:
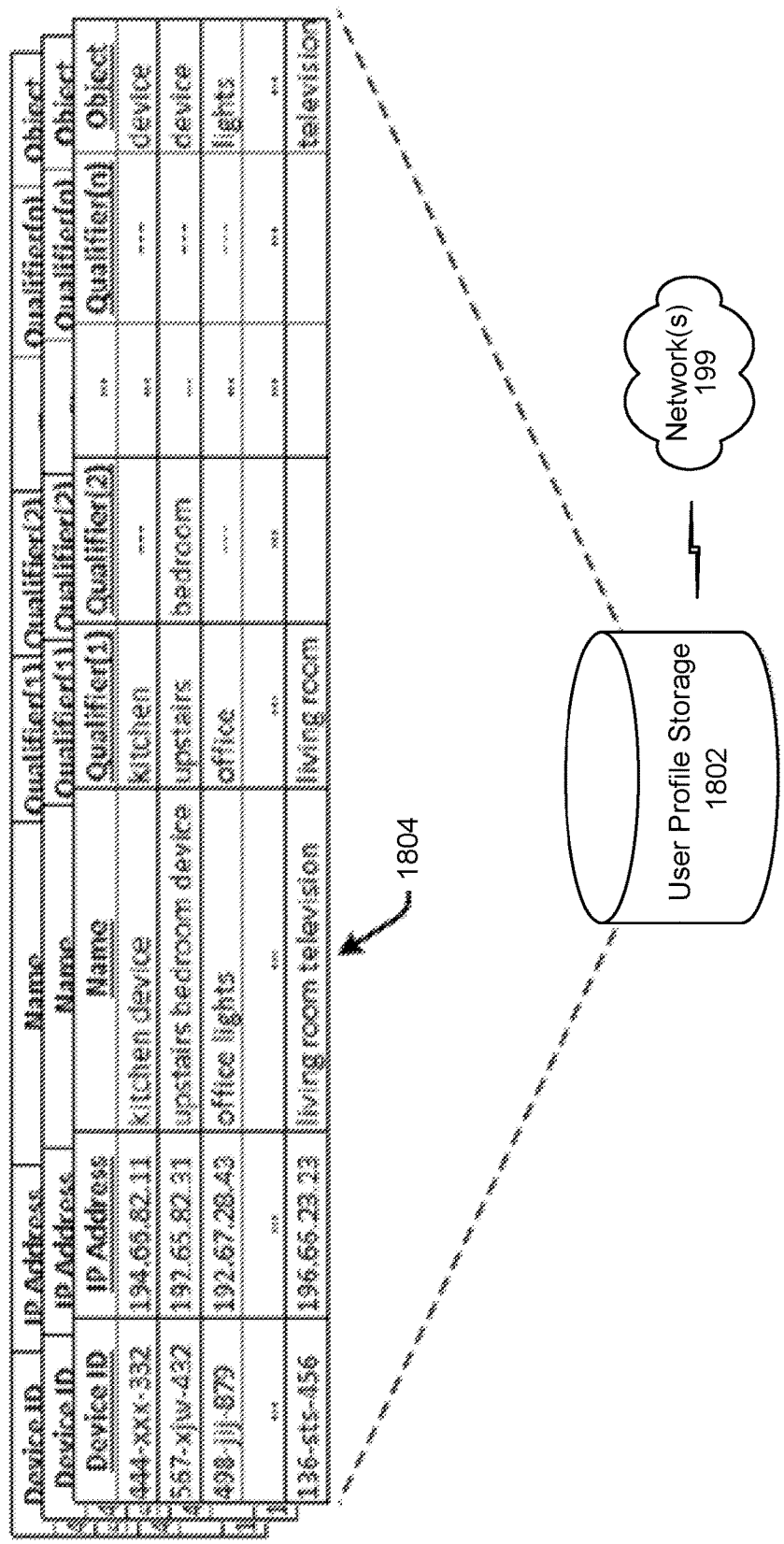
FIG. 18 illustrates data stored and associated with user profiles according to embodiments of the present disclosure.

The server 120 may include or refer to data regarding user accounts, shown by the user profile storage 1802 illustrated in FIG. 18. The user profile storage may be located proximate to server 120, or may otherwise be in communication with various components, for example over network 165. The user profile storage 1802 may include a variety of information related to individual users, households, accounts, etc. that interact with the system 100. For illustration, as shown in FIG. 18, the user profile storage 1802 may include data regarding the devices associated with particular individual user accounts 1804. In an example, the user profile storage 1802 is a cloud-based storage. Such data may include device identifier (ID) and internet protocol (IP) address information for different devices as well as names by which the devices may be referred to by a user. Further qualifiers describing the devices may also be listed along with a description of the type of object of the device. Further, the user account 1804 may include or be associated with sample user speech which may be used as reference audio data as described above in reference to FIG. 12. Further, while the user profile storage 1802 may include stored reference audio data 1204, it may also, or instead, store an encoded reference feature vector 1410 corresponding to the stored reference audio data 1204 so that at runtime the system may simply refer to the stored encoded reference feature vector 1410 rather than having to encode the reference audio data at runtime.

Figure 19:
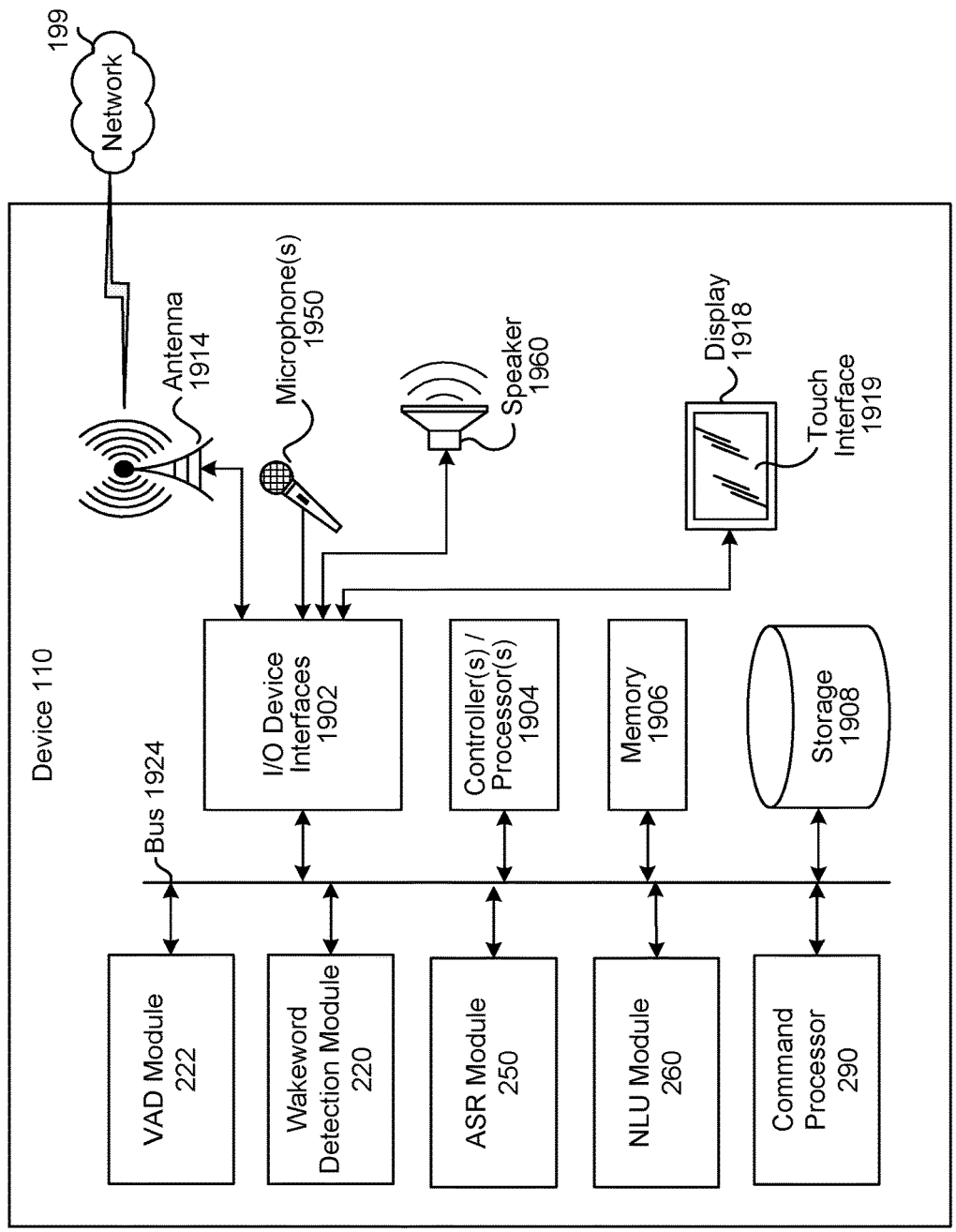
FIG. 19 is a block diagram conceptually illustrating example components of a device according to embodiments of the present disclosure.
Figure 20:
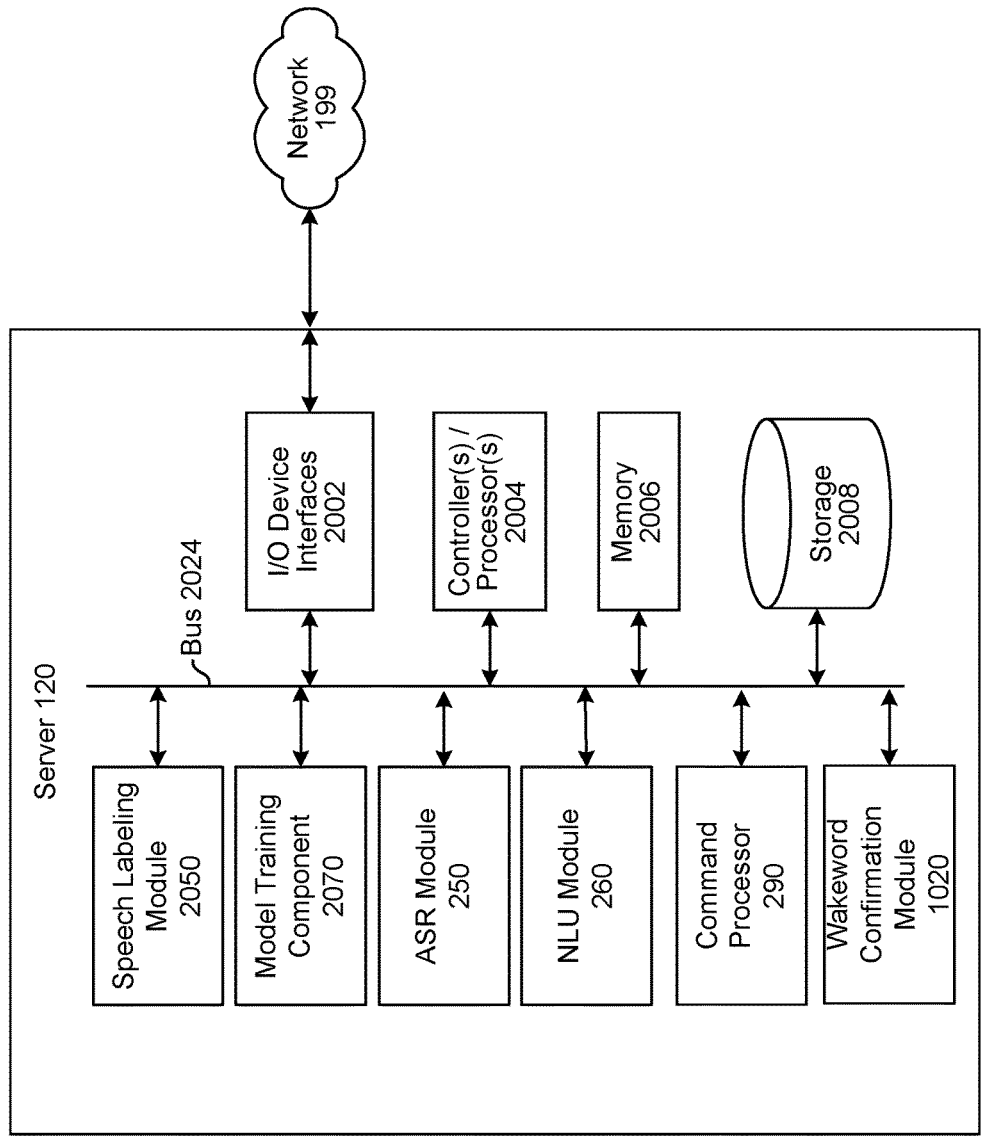
FIG. 20 is a block diagram conceptually illustrating example components of a server according to embodiments of the present disclosure.

FIG. 19 is a block diagram conceptually illustrating a local device 110 that may be used with the described system. FIG. 20 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1904/2004), that may each include a central processing unit (CPU) for processing data and computer-readable instructions, and a memory (1906/2006) for storing data and instructions of the respective device. The memories (1906/2006) may individually include volatile random access memory (RAM), non-volatile read only memory (ROM), non-volatile magnetoresistive (MRAM) and/or other types of memory. Each device may also include a data storage component (1908/2008), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1902/2002).

Computer instructions for operating each device (110/120) and its various components may be executed by the respective device's controller(s)/processor(s) (1904/2004), using the memory (1906/2006) as temporary "working" storage at runtime. A device's computer instructions may be stored in a non-transitory manner in non-volatile memory (1906/2006), storage (1908/2008), or an external device(s). Alternatively, some or all of the executable instructions may be embedded in hardware or firmware on the respective device in addition to or instead of software.

Each device (110/120) includes input/output device interfaces (1902/2002). A variety of components may be connected through the input/output device interfaces, as will be discussed further below. Additionally, each device (110/120) may include an address/data bus (1924/2024) for conveying data among components of the respective device. Each component within a device (110/120) may also be directly connected to other components in addition to (or instead of) being connected to other components across the bus (1924/2024).

Referring to the device 110 of FIG. 19, the device 110 may include a display 1918, which may comprise a touch interface 1919. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1902 that connect to a variety of components such as an audio output component such as a speaker 1960, a wired headset or a wireless headset (not illustrated) or other component capable of outputting audio. The device 110 may also include an audio capture component. The audio capture component may be, for example, a microphone 1950 or array of microphones, a wired headset or a wireless headset (not illustrated), etc. The microphone 1950 may be configured to capture audio. If an array of microphones is included, approximate distance to a sound's point of origin may be performed acoustic localization based on time and amplitude differences between sounds captured by different microphones of the array. The device 110 (using microphone 1950, wakeword detection module 220, ASR module 250, etc.) may be configured to determine audio data corresponding to detected audio data. The device 110 (using input/output device interfaces 1902, antenna 1914, etc.) may also be configured to transmit the audio data to server 120 for further processing or to process the data using internal components such as a wakeword detection module 220.

For example, via the antenna(s), the input/output device interfaces 1902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words. The ASR module 250 (or another component) may also be configured to check the ASR confidence using the techniques described above.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge exchange and/or entity library, or those storages may be separately located.

The device 110 and/or server 120 may also include a command processor 290 that is configured to execute commands/functions associated with a spoken command as described above.

The device 110 may include a voice activity detection (VAD) module 222 that performs voice activity detection as described above. The VAD module 222 may incorporate techniques described above, including considering audio feature vectors and corresponding labels as discussed in reference to FIG. 16A.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1908 may store data relating to keywords and functions to enable the wakeword detection module 220 to perform the algorithms and methods described above. The locally stored speech models may be preconfigured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1108 and compare the captured audio to the stored models and audio sequences using audio comparison, pattern recognition, keyword spotting, audio signature, and/or other audio processing techniques.

The server may also include an RNN encoder 950 for encoding data into a vector form as described above. The server may also include a model training component 2070 for training or retraining various model or classifiers discussed above. Various machine learning techniques may be used to perform various steps described above, such as training/retraining an RC, entity tagger, semantic parser, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The server 120 may also include a wakeword confirmation module 1020 that can operate as described above in reference to FIG. 10. The server 120 may also include a speech labeling module 2050 that can label incoming audio data using classifier 1520 as described above in reference to FIG. 15. The speech labeling module 2050 may also include RNN encoder 1450 to create encoded reference feature vectors 1410.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 19 and 20, are exemplary, and may be located a stand-alone device or may be included, in whole or in part, as a component of a larger device or system.

Figure 21:
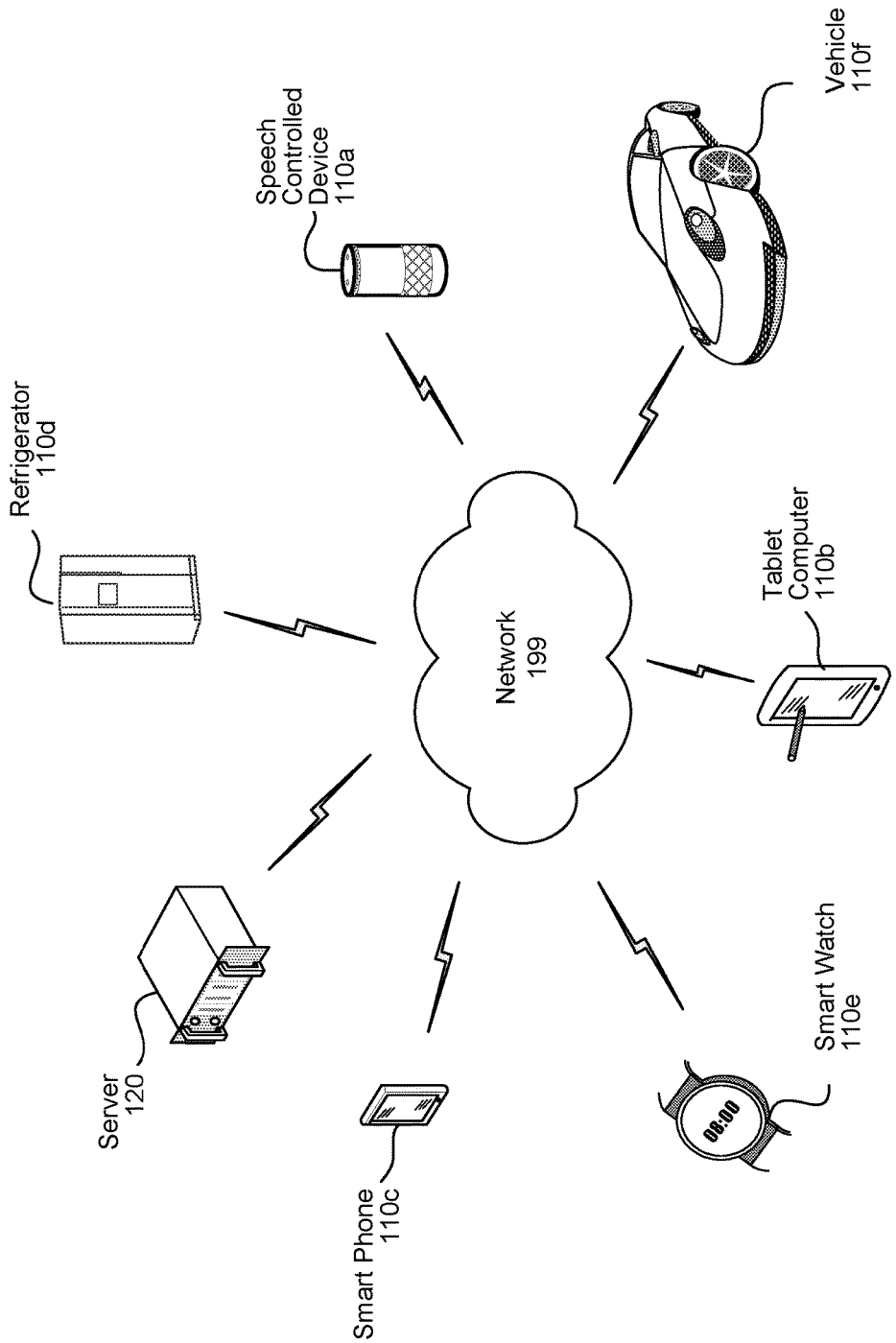
FIG. 21 illustrates an example of a computer network for use with the system.

As illustrated in FIG. 21 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 1950 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer implemented method for identifying speech from a desired speaker for automatic speech recognition (ASR), the method comprising:
    receiving audio data corresponding to speech, the audio data comprising a plurality of audio frames;
    processing the plurality of audio frames to determine a first plurality of feature vectors corresponding to a first portion of the audio data and a second plurality of feature vectors corresponding to a second portion of the audio data;
    determining that the first plurality of feature vectors corresponds to a wakeword;
    processing the first plurality of feature vectors with a recurrent neural network encoder to determine a reference feature vector corresponding to speech from a desired speaker;
    processing the second plurality of feature vectors, and the reference feature vector, using a neural-network classifier to determine a first score corresponding to a first feature vector in the second plurality, the first score corresponding to a likelihood that the first feature vector corresponds to audio spoken by the desired speaker;
    determining that the score is above a threshold;
    creating an indication that the first feature vector corresponds to speech from the desired speaker;
    determining a first weight corresponding to the first feature vector based on the first feature vector corresponding to speech from the desired speaker; and
    performing ASR using the first weight and the first feature vector.

2. The computer-implemented method of claim 1, further comprising:
    processing at least a portion of the plurality of audio frames to determine a third plurality of feature vectors corresponding to the second portion;
    processing the third plurality of feature vectors and the reference feature vector using the neural-network classifier to determine a second score corresponding to a second feature vector in the third plurality, the second score corresponding to a likelihood that the second feature vector corresponds to audio spoken by the desired speaker;
    determining that the second score is below the threshold;
    creating a second indication that the second feature vector corresponds to speech from a different speaker as the wakeword; and
    determining a second weight corresponding to the second feature vector based on the second feature vector corresponding to speech from a different speaker as the wakeword, wherein the second weight is less than the first weight.

3. The computer-implemented method of claim 1, further comprising:
    identifying a first pair of feature vectors corresponding to audio frames positioned prior to a first audio frame corresponding to the first feature vector;

identifying a second pair of feature vectors corresponding to audio frames positioned after the first audio frame,
wherein processing the second plurality of feature vectors and the reference feature vector using the neural-network classifier further comprises processing the first pair of feature vectors, the first feature vector, and the second pair of feature vectors to determine the first score.

4. A computer implemented method comprising:
receiving first audio data as part of a first interaction with a device, the first audio data corresponding to first speech from a first speaker;
determining, using the first audio data and a recurrent neural network, a reference feature vector:
receiving second audio data as part of a second interaction with the device;
determining, using the reference feature vector and a trained model, that a first portion of the second audio data corresponds to second speech from a second speaker;
determining, using the reference feature vector and the trained model, that a second portion of the second audio data corresponds to third speech from the first speaker; and
based at least in part on determining that the first portion of the second audio data corresponds to the second speaker, executing a command corresponding to the second portion of the second audio data.

5. A computer implemented method comprising:
receiving audio data as part of an interaction with a device;
determining that a first portion of the audio data represents a wakeword spoken by a first speaker;
based at least in part on determining that the first portion of the audio data represents the wakeword, processing the first portion of the audio data to determine a reference feature vector;
determining, using the reference feature vector and a trained model, that a second portion of the audio data represents speech of a second speaker;
determining, using the reference feature vector and the trained model, that a third portion of the audio data represents speech of the first speaker; and
based at least in part on determining that the second portion of the audio data represents the speech of the second speaker, executing a command corresponding to the third portion of the audio data.

6. The computer-implemented method of claim 4, further comprising:
determining a first score corresponding to whether the reference feature vector corresponds to the third speech from the first speaker.

7. The computer implemented method of claim 6, further comprising:
determining a first weight corresponding to the reference feature vector based on the first score; and
performing speech recognition using the first weight and the reference feature vector.

8. The computer implemented method of claim 7, further comprising:
determining a second score corresponding to whether the reference feature vector corresponds to the second speech from the second speaker, wherein the second score is lower that the first score; and
determining a second weight corresponding to the second score, wherein the second weight is less than the first weight.

9. The computer-implemented method of claim 4, wherein the recurrent neural network is configured to input a plurality of feature vectors, and wherein determining the reference feature vector is based at least in part on each of the plurality of feature vectors.

10. A computing system comprising:
at least one processor; and
at least one memory including instructions that, when executed by the at least one processor, cause the computing system to:
receive first audio data as part of a first interaction with a device, the first audio data corresponding to first speech from a first speaker;
determine, using the first audio data and a recurrent neural network, a reference feature vector;
receiving second audio data as part of a second interaction with the device;
determine, using the reference feature vector and a trained model, that a first portion of the first audio data corresponds to second speech from a second speaker;
determine, using the reference feature vector and the trained model, that a second portion of the second audio data corresponds to third speech from the first speaker; and
based at least in part on determining that the first portion of the second audio data corresponds to the second speaker, execute a command corresponding to the second portion of the second audio data.

11. A computing system comprising:
at least one processor; and
at least one memory including instructions that, when executed by the at least one processor, cause the system to:
receive audio data as part of an interaction with a device;
determine that a first portion of the audio data represents a wakeword spoken by a first speaker;
based at least in part on determining that the first portion of the audio data represents the wakeword, process the first portion of the audio data to determine a reference feature vector;
determine, using the reference feature vector and a trained model, that a second portion of the audio data represents speech of a second speaker;
determine, using the reference feature vector and the trained model, that a third portion of the audio data represents speech of the first speaker; and
based at least in part on determining that the second portion of the audio data represents the speech of the second speaker, execute a command corresponding to the third portion of the audio data.

12. The computing system of claim 10, wherein the at least one memory further includes instructions that further configure the system to:
determine a first score corresponding to whether the reference feature vector corresponds to the third speech from the first speaker.

13. The computing system of claim 12, wherein the at least one memory further includes instructions that further configure the system to:
determine a first weight corresponding to the reference feature vector based on the first score; and
perform speech recognition using the first weight and the reference feature vector.

14. The computing system of claim 13, wherein the at least one memory further includes instructions that further configure the system to:
- determine a second score corresponding to whether the reference feature vector corresponds to the second speech from the second speaker, wherein the second score is lower that the first score; and
- determine a second weight corresponding to the second score, wherein the second weight is less than the first weight.

15. The computing system of claim 10, wherein the recurrent neural network is configured to input a plurality of feature vectors, and wherein the determination of the reference feature vector is based at least in part on each of the plurality of the plurality of feature vectors.

16. The computer implemented method of claim 4, further comprising:
- determining that the first audio data corresponds to a wakeword.

17. The computing system of claim 10, wherein the at least one memory further includes instructions that further configure the system to:
- determine that the first audio data corresponds to a wakeword.

* * * * *